US011653072B2

(12) United States Patent
Palmer et al.

(10) Patent No.: US 11,653,072 B2
(45) Date of Patent: May 16, 2023

(54) METHOD AND SYSTEM FOR GENERATING INTERACTIVE MEDIA CONTENT

(71) Applicant: Zuma Beach IP Pty Ltd, Melbourne (AU)

(72) Inventors: Barry John Palmer, Balnarring Beach (AU); Stuart Paul Berwick, Marina Del Rey, CA (US); Nathaniel Garbutt, Diamond Creek (AU); James Lee, Reservoir (AU)

(73) Assignee: Zuma Beach IP Pty Ltd, Melbourne (AU)

( * ) Notice: Subject to any disclaimer, the term of this patent is extended or adjusted under 35 U.S.C. 154(b) by 0 days.

(21) Appl. No.: 16/567,893

(22) Filed: Sep. 11, 2019

(65) Prior Publication Data

US 2020/0120400 A1    Apr. 16, 2020

(30) Foreign Application Priority Data

Sep. 12, 2018   (AU) ................................ 2018903429

(51) Int. Cl.
*H04N 21/8545* (2011.01)
*H04N 21/845* (2011.01)
(Continued)

(52) U.S. Cl.
CPC ....... *H04N 21/8545* (2013.01); *G06V 40/164* (2022.01); *G06V 40/166* (2022.01);
(Continued)

(58) Field of Classification Search
CPC ........... H04N 21/4223; H04N 21/4318; H04N 21/47205; H04N 21/4781; H04N 21/8456;
(Continued)

(56) References Cited

U.S. PATENT DOCUMENTS 5,808,628 A    9/1998    Hinson et al.
8,464,304 B2   6/2013    Harwell et al.
(Continued)

OTHER PUBLICATIONS

International Preliminary Report on Patentability dated Aug. 29, 2017 in PCT App. No. PCT/AU2016/050117 (6 pages).
(Continued)

*Primary Examiner* — Michael B. Pierorazio
*Assistant Examiner* — Jaycee Imperial
(74) *Attorney, Agent, or Firm* — Matthew Beal; Potomac Law Group, PLLC

(57) ABSTRACT

A method for generating interactive media content on a portable electronic user device is disclosed. The method includes in one or more electronic processing devices: retrieving an Edit Decision List (EDL), the EDL providing an event driven timeline for the interactive media content that defines events including: one or more segments of pre-existing media content to be used in the generation of the interactive media content; timestamps for when the one or more segments of pre-existing media content are to be introduced into the timeline and their associated duration; one or more user interactions to be used in the generation of the interactive media content; and, timestamps for when the one or more user interactions are to be introduced into the timeline and their associated duration; and, processing the EDL to generate the interactive media content in real time by: retrieving the one or more segments of pre-existing media content; recording the one or more user interactions using a sensing device of the user device; and, combining the one or more recorded user interactions with the one or more segments of pre-existing media in accordance with the event driven timeline of the EDL.

35 Claims, 12 Drawing Sheets

(51) Int. Cl.
*H04N 21/431* (2011.01)
*G06V 40/20* (2022.01)
*G06V 40/16* (2022.01)

(52) U.S. Cl.
CPC ......... *G06V 40/28* (2022.01); *H04N 21/4318* (2013.01); *H04N 21/8456* (2013.01)

(58) Field of Classification Search
CPC ............ H04N 21/8545; G06V 40/164; G06V 40/166; G06V 40/20; G06V 40/28
USPC ........................................................ 725/32
See application file for complete search history.

(56) References Cited

U.S. PATENT DOCUMENTS

| | | | |
|---|---|---|---|
| 8,601,506 B2 | 12/2013 | Harwell et al. | |
| 8,745,500 B1 | 6/2014 | Kostello et al. | |
| 9,207,844 B2 | 12/2015 | Snibbe et al. | |
| 9,268,787 B2 | 2/2016 | Snibbe et al. | |
| 9,270,844 B2 | 2/2016 | Takano | |
| 9,336,512 B2 | 5/2016 | Outerbridge | |
| 9,674,580 B2 | 6/2017 | Barker et al. | |
| 9,734,870 B2 | 8/2017 | Sievert et al. | |
| 9,736,448 B1 | 8/2017 | Tsetytlin | |
| 9,824,477 B1 | 11/2017 | McDonald | |
| 9,940,973 B2 | 4/2018 | Roberts et al. | |
| 10,002,642 B2 | 6/2018 | Snibbe et al. | |
| 10,120,530 B2 | 11/2018 | Snibbe et al. | |
| 10,276,029 B2 | 4/2019 | Moore | |
| 10,356,022 B2 | 7/2019 | Joyce et al. | |
| 10,362,340 B2 | 7/2019 | Ramadorai et al. | |
| 10,397,636 B1 | 8/2019 | Kalva et al. | |
| 10,623,801 B2 | 4/2020 | Jeffries | |
| 10,637,811 B2 | 4/2020 | Outerbridge | |
| 10,931,911 B2 | 2/2021 | Pollack | |
| 2005/0066279 A1 | 3/2005 | LeBarton et al. | |
| 2005/0154746 A1 | 7/2005 | Liu et al. | |
| 2006/0222320 A1 | 10/2006 | Bushell et al. | |
| 2008/0028093 A1* | 1/2008 | Pickens | H04L 65/1093 709/231 |
| 2008/0208692 A1 | 8/2008 | Garaventi et al. | |
| 2009/0087161 A1 | 4/2009 | Roberts et al. | |
| 2009/0164034 A1 | 6/2009 | Cohen et al. | |
| 2010/0031149 A1* | 2/2010 | Gentile | H04N 5/91 715/723 |
| 2010/0066905 A1 | 3/2010 | Ben Natan | |
| 2010/0223128 A1 | 9/2010 | Dukellis et al. | |
| 2010/0223314 A1 | 9/2010 | Gadel et al. | |
| 2010/0251295 A1 | 9/2010 | Amento et al. | |
| 2010/0316281 A1* | 12/2010 | Lefevre | G06T 7/75 382/154 |
| 2011/0026898 A1* | 2/2011 | Lussier | G06F 3/04842 386/280 |
| 2011/0321082 A1 | 12/2011 | Weerasinghe | |
| 2012/0017150 A1 | 1/2012 | Pollack | |
| 2012/0185772 A1 | 7/2012 | Kotelly et al. | |
| 2012/0192239 A1 | 7/2012 | Harwell et al. | |
| 2012/0197966 A1* | 8/2012 | Wolf | H04L 65/80 709/203 |
| 2012/0206566 A1 | 8/2012 | Fedoseyeva | |
| 2012/0209902 A1 | 8/2012 | Outerbridge | |
| 2012/0236201 A1 | 9/2012 | Larsen et al. | |
| 2012/0240061 A1 | 9/2012 | Hillenius et al. | |
| 2012/0304237 A1 | 11/2012 | Harwell et al. | |
| 2012/0308209 A1 | 12/2012 | Zalatel | |
| 2013/0036201 A1* | 2/2013 | McLaughlin | H04L 65/60 709/219 |
| 2013/0047081 A1 | 2/2013 | Long et al. | |
| 2013/0259446 A1 | 10/2013 | Sathish | |
| 2013/0301918 A1 | 11/2013 | Frenkel | |
| 2013/0305287 A1 | 11/2013 | Wong et al. | |
| 2013/0311886 A1 | 11/2013 | Ku et al. | |
| 2014/0040742 A1 | 2/2014 | Park et al. | |
| 2014/0074712 A1 | 3/2014 | Palmer et al. | |
| 2014/0108400 A1 | 4/2014 | Casteineiras | |
| 2014/0133832 A1 | 5/2014 | Sumler et al. | |
| 2014/0133852 A1 | 5/2014 | Chairman et al. | |
| 2014/0168354 A1* | 6/2014 | Clavel | H04L 65/4038 348/14.09 |
| 2014/0245334 A1 | 8/2014 | Belyaev | |
| 2014/0281996 A1 | 9/2014 | Paulraj et al. | |
| 2014/0304602 A1* | 10/2014 | Lettau | G11B 27/031 715/723 |
| 2014/0310746 A1 | 10/2014 | Larsen et al. | |
| 2014/0331113 A1 | 11/2014 | Vaccarella et al. | |
| 2014/0359448 A1 | 12/2014 | Paulus et al. | |
| 2015/0067514 A1 | 3/2015 | Lewis et al. | |
| 2015/0104155 A1 | 4/2015 | Bloch et al. | |
| 2015/0184185 A1 | 7/2015 | Eronen et al. | |
| 2015/0318020 A1 | 11/2015 | Pribula | |
| 2016/0037087 A1 | 2/2016 | Price | |
| 2016/0066007 A1 | 3/2016 | Zhang | |
| 2016/0078900 A1 | 3/2016 | Baron et al. | |
| 2016/0088323 A1 | 3/2016 | Papish et al. | |
| 2016/0173960 A1 | 6/2016 | Snibbe et al. | |
| 2016/0196852 A1 | 7/2016 | Sievert et al. | |
| 2016/0225405 A1 | 8/2016 | Matias et al. | |
| 2016/0227228 A1* | 8/2016 | Pomeroy | H04N 9/8205 |
| 2016/0292511 A1 | 10/2016 | Ayalasomayajula | |
| 2016/0337718 A1 | 11/2016 | Talbott | |
| 2016/0345066 A1 | 11/2016 | Barker et al. | |
| 2016/0379599 A1* | 12/2016 | Yeung | G09G 5/14 345/520 |
| 2017/0019363 A1 | 1/2017 | Outerbridge | |
| 2017/0062012 A1 | 3/2017 | Bloch et al. | |
| 2017/0134776 A1 | 5/2017 | Ranjeet et al. | |
| 2017/0180780 A1 | 6/2017 | Jeffries et al. | |
| 2017/0201478 A1 | 7/2017 | Joyce et al. | |
| 2017/0221371 A1* | 8/2017 | Yang | H04L 65/403 |
| 2017/0272821 A1 | 9/2017 | Barker et al. | |
| 2017/0303001 A1* | 10/2017 | Montoya | H04N 21/4667 |
| 2017/0316807 A1 | 11/2017 | Herkert-Oakland | |
| 2017/0351922 A1 | 12/2017 | Campbell | |
| 2018/0048831 A1 | 2/2018 | Berwick et al. | |
| 2018/0150985 A1 | 5/2018 | McDonald | |
| 2018/0295396 A1 | 10/2018 | Ramadorai et al. | |
| 2018/0308524 A1 | 10/2018 | Muyal et al. | |
| 2018/0367869 A1* | 12/2018 | Gray | H04L 65/4053 |
| 2019/0098252 A1* | 3/2019 | Tiger | G11B 27/28 |
| 2019/0149762 A1 | 5/2019 | Pollack | |
| 2019/0180780 A1 | 6/2019 | Chang et al. | |
| 2019/0207885 A1 | 7/2019 | Kozhemiak et al. | |
| 2019/0342241 A1 | 11/2019 | Joyce et al. | |
| 2020/0029117 A1 | 1/2020 | Kalva et al. | |

OTHER PUBLICATIONS

International Search Report dated Apr. 13, 2016 in PCT App. No. PCT/AU2016/050117 (4 pages).
Written Opinion of the International Search Authority dated Apr. 13, 2016 in PCT App. No. PCT/AU2016/050117 (5 pages).
Debord, S., "3 Steps to Professional Quality Listing Videos From Your Smartphone," Oct. 17, 2014, [retrieved from internet on Mar. 29, 2016], <https://www.warealtor.org/resources/REmagazine/blogpost/remagazineonline/2014/10/17/3-steps-to-professional-quality-listing-videos-from-your-smartphone>.

* cited by examiner

METHOD AND SYSTEM FOR GENERATING INTERACTIVE MEDIA CONTENT

PRIORITY DOCUMENTS

The present application claims priority from Australian Provisional Patent Application No. 2018903429 titled "METHOD AND SYSTEM FOR GENERATING INTERACTIVE MEDIA CONTENT" as filed on 12 Sep. 2018, the content of which is hereby incorporated by reference in its entirety.

BACKGROUND OF THE INVENTION

The present invention relates to a method and system for generating interactive media content on a portable electronic user device, and in one example to a mobile video engine for use in generating the interactive media content.

INCORPORATION BY REFERENCE

The following publication is referred to in the present application and its contents are hereby incorporated by reference in its entirety:
International Patent Application No. PCT/AU2016/050117 titled 'GENERATION OF COMBINED VIDEOS' in the name of Zuma Beach IP Pty Ltd.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

PCT/AU2016/050117 discloses methods of generating video data on a portable electronic device, the method comprising the steps of: the portable electronic device accessing pre-generated data representing a pre-generated video synchronized with pre-generated audio; the portable electronic device accessing user-generated content (UGC) data representing a user-generated photo or video generated by a camera of the portable electronic device; and the portable electronic device generating combined data representing a combined video that includes a portion of each of the pre-generated video, and the user-generated photo or video.

The methods disclosed in PCT/AU2016/050117 had several drawbacks including difficulty in getting the pre-generated video or Base Content Piece (BCP) in sync with the UGC video as there were no time codes that worked across content. The previous work had transitions between the BCP and UGC and was focussed on branding the user's video content. Furthermore, the previous techniques for creating interactive video required too much memory and could only sustain experiences of 10 to 15 seconds.

It is desirable to generate media content that is more interactive for users, in particular children. Children's TV shows and entertainment such as the Wiggles, Sesame Street and Disney characters provide both an entertainment and educational benefit to children. Such shows typically involve a degree of interaction with children as the show's characters encourage audience participation such as singing along and dancing. These days, as children begin interacting with mobile phones and tablets from an early age, it would be desirable to create an interactive mobile experience for children allowing them to interact with some of their favourite TV shows and characters.

It is against this background, and the problems and difficulties associated therewith, that the present invention has been developed.

SUMMARY OF THE PRESENT INVENTION

In one broad form, an aspect of the present invention seeks to provide a method for generating interactive media content on a portable electronic user device, the method including in one or more electronic processing devices:
  a) retrieving an Edit Decision List (EDL), the EDL providing an event driven timeline for the interactive media content that defines events including:
    i) one or more segments of pre-existing media content to be used in the generation of the interactive media content;
    ii) timestamps for when the one or more segments of pre-existing media content are to be introduced into the timeline and their associated duration;
    iii) one or more user interactions to be used in the generation of the interactive media content; and,
    iv) timestamps for when the one or more user interactions are to be introduced into the timeline and their associated duration; and,
  b) processing the EDL to generate the interactive media content in real time by:
    i) retrieving the one or more segments of pre-existing media content;
    ii) recording the one or more user interactions using a sensing device of the user device; and,
    iii) combining the one or more recorded user interaction with the one or more segments of pre-existing media content in accordance with the event driven timeline of the EDL.

In one embodiment, the method further includes receiving a user input via the user device indicative of a user selection of a type of interactive media content to be generated and whereby the EDL is retrieved at least in part based on the user selection.

In one embodiment, the types of interactive media content to be generated include one or more of:
  a) stories;
  b) movies;
  c) songs; and,
  d) games.

In one embodiment, a plurality of instances of one or more types of interactive media content are available for user selection.

In one embodiment, each instance has an associated EDL defining how the interactive media content is to be generated.

In one embodiment, each EDL is stored locally on the user device.

In one embodiment, each instance is associated with one or more segments of pre-existing media content that are stored locally on the user device.

In one embodiment, the one or more segments of pre-existing media content include one or more of:
  a) video;
  b) audio;
  c) images; and,
  d) overlays and effects.

In one embodiment, the one or more user interactions include a video recording of the user.

In one embodiment, the method includes in the one or more electronic processing devices:
  a) causing a camera of the user device to open;
  b) performing face tracking on the user's face via the camera; and,
  c) applying an augmented reality (AR) mask to the user's face using results of the face tracking.

In one embodiment, the AR mask is applied to the user's face in the video recording.

In one embodiment, the face tracking is used to overlay the AR mask onto a segment of pre-existing media content.

In one embodiment, the AR mask moves in response to movement of the user's face.

In one embodiment, the user can perform interactions via facial movements and gestures.

In one embodiment, the method includes in the one or more electronic processing devices:
  a) determining that a facial movement or gesture has been performed using the results of the face tracking; and,
  b) in response to determining that the facial movement or gesture has been performed, applying an effect to a current scene being generated.

In one embodiment, the one or more user interactions include an audio recording of the user recorded by a microphone of the user device.

In one embodiment, the EDL defines at least one interaction cue at a pre-defined timestamp that prompts the user to perform an interaction via the user device.

In one embodiment, the interaction cue is one or more of:
  a) an on-screen button which is displayed to the user on the user device;
  b) an audio cue provided in a segment of pre-existing media content; and,
  c) a visual cue provided in a segment of pre-existing media content.

In one embodiment, the interaction cue has a pre-defined duration.

In one embodiment, combining the one or more recorded user interactions with the one or more segments of pre-existing media includes one or more of:
  a) splicing the one or more user interactions between segments of pre-existing media content in accordance with the event driven timeline of the EDL; and,
  b) overlaying the one or more user interactions over one or more segments of pre-existing media content in accordance with the event driven timeline of the EDL.

In one embodiment, overlaying the one or more user interactions over the one or more segments of pre-existing media content includes applying an audio or visual effect in sync with the time that the user performs the interaction.

In one embodiment, the EDL includes a single pre-existing audio track that plays for the duration of the generated interactive media content.

In one embodiment, the processing to generate the interactive media content is performed locally on the user device.

In one embodiment, the generated interactive media content is stored locally on the user device.

In one embodiment, the method includes in the one or more electronic processing devices simultaneously:
  a) decoding one or more segments of pre-existing video content;
  b) reading data from a camera stream;
  c) encoding the data read from the camera stream to form a video clip for replay; and,
  d) performing face tracking on the user's face in the camera stream.

In one embodiment, the method further includes applying an augmented reality (AR) mask to the user's face in accordance with results of the face tracking.

In one embodiment, an offset is added to the EDL to account for user reaction time when performing an interaction to ensure that a user video recording is in sync with one or more segments of pre-existing media content.

In one embodiment, the offset is indicative of a delay between when the user video recording is initiated and when the video recording is spliced into the interactive media content being generated.

In one embodiment, the method includes displaying a representation of the interactive media content to the user on the user device as the content is being generated in real time.

In another broad form, the present invention seeks to provide a system for generating interactive media content on a portable electronic user device, the system including one or more electronic processing devices configured to:
  a) receive a user input via the user device indicative of a user selection of a type of interactive media content to be generated;
  b) retrieve an Edit Decision List (EDL) based at least in part on the user selection, the EDL providing an event driven timeline for the interactive media content that defines events including:
    i) one or more segments of pre-existing media content to be used in the generation of the interactive media content;
    ii) timestamps for when the one or more segments of pre-existing media content are to be introduced into the timeline and their associated duration;
    iii) one or more user interactions to be used in the generation of the interactive media content; and,
    iv) timestamps for when one or more user interactions are to be introduced into the timeline and their associated duration; and,
  c) process the EDL to generate the interactive media content in real time by:
    i) retrieving the one or more segments of pre-existing media content;
    ii) recording the one or more user interactions using a sensing device of the user device; and,
    iii) combining the one or more recorded user interactions with the one or more segments of pre-existing media content in accordance with the event driven timeline of the EDL.

In one embodiment, the interactive media content is generated by application software executing on the user device.

In one embodiment, the application software includes a mobile video engine for use in generating the interactive media content.

In one embodiment, the user device includes a data store for storing at least:
  a) the EDL;
  b) the one or more segments of pre-existing media content; and,
  c) the generated interactive media content.

In one embodiment, the one or more electronic processing devices form part of the user device.

In yet a further broad form, the present invention seeks to provide a mobile video engine for use in generating interactive media content on a portable electronic user device, the mobile video engine including computer executable code, which when executed by at least one suitably programmed electronic processing device causes the at least one processing device to:

a) retrieve an Edit Decision List (EDL), the EDL providing an event driven timeline for the interactive media content that defines events including:
  i) one or more segments of pre-existing media content to be used in the generation of the interactive media content;
  ii) timestamps for when the one or more segments of pre-existing media are to be introduced into the timeline and their associated duration;
  iii) one or more user interactions to be used in the generation of the interactive media content; and,
  iv) timestamps for when the one or more user interactions are to be introduced into the timeline and their associated duration; and,
b) process the EDL to generate the interactive media content in real time by:
  i) retrieving the one or more segments of pre-existing media content;
  ii) recording the one or more user interactions using a sensing device of the user device; and,
  iii) combining the one or more recorded user interactions with the one or more segments of pre-existing media content in accordance with the event driven timeline of the EDL.

In one embodiment, the mobile video engine causes a representation of the generated interactive media content to be displayed on a display of the user device.

In one embodiment, the mobile video engine processing is performed locally on the user device.

In another broad form, there is provided a mobile video engine for use in generating interactive media content on a portable electronic user device, the mobile video engine being configured to cause at least one electronic processing device to:
a) receive an Edit Decision List (EDL) file defining an event driven timeline for the interactive media content, the event driven timeline including events indicative of at least:
  i) one or more segments of pre-existing media content; and,
  ii) one or more user interactions; and,
b) process the EDL file by:
  i) buffering one or more events defined in the timeline of the EDL;
  ii) commencing playback of the interactive media content in accordance with a buffering status of the one or more events, playback including:
    (1) rendering frames associated with the one or more events;
    (2) compositing the rendered events; and,
    (3) causing the rendered and composited events to be displayed in real time on the user device in accordance with the duration of each event as defined by the EDL.

In one embodiment, the mobile video engine includes a playback driver, a playback scheduler, a frame scheduler and an EDL runner.

In one embodiment, the playback driver is created during an initialisation stage which in turns creates the other components. The playback driver is then given an EDL to play.

In one embodiment, during a buffering phase, the EDL is passed to the EDL runner. The EDL runner begins processing the EDL in a separate thread and looks ahead to determine events to buffer. Once an event is found that needs buffering, the EDL runner passes the event to the playback scheduler.

In one embodiment, the events are deconstructed into work units required in order to complete what the event describes. In one example, the work units are directed acyclic graphs (DAGs). This is typically performed in a separate thread to the thread in which the EDL runner is processing the EDL.

In one embodiment, the DAGs are then initialised by the playback scheduler which typically includes loading resources such as movie files, images etc. from memory. Once the DAGs are initialised, they are provided to the frame scheduler that places the work units into a pending queue.

In one embodiment, once enough DAGs have been produced or buffered, a signal is sent that playback can commence.

In one embodiment, once playback has commenced, the frame scheduler begins placing any pending work units from the pending queue into an active queue at the specified time.

In one embodiment, for every frame to be rendered, the frame scheduler passes a list of active work units to be evaluated for that frame to the playback driver.

In one embodiment, the playback driver then distributes each work unit to a thread pool for evaluation.

In one embodiment, the results of work units are then rendered, composited and presented to the display screen of the user device. In the case of audio, the audio is mixed and output through the user device's speakers.

In one embodiment, once a work unit has exceeded its specified duration as specified by the event in the EDL, it is removed from the active list and all resources it used are freed.

In one embodiment, an event is used in the EDL to specify that face tracking should occur. The face tracking task is a DAG and uses a variety of computational components whose outputs combine to produce an affine transform that is used to render a piece of 3D geometry on the user's face.

In one embodiment, a component of face tracking includes object detection. In one example, a modified version of the pixel intensity comparison-based objects (PICO) algorithm to perform this task. In one embodiment, this algorithm is a variation of the original Viola-Jones algorithm in that it uses a sliding window approach to scan the image. Each window is then checked if there is a face inside it.

In one embodiment, the object detection algorithm is modified so that a batch of windows is distributed to a thread pool to be evaluated asynchronously. The output of this step is a bounding box that encompasses the users face.

In one embodiment, this bounding box is then fed into a modified version of the one Euro filter. The modification enables parameters of the filter to be altered based on the estimated velocity of the head movement. In one embodiment, when the head is moving slowly, the settings are biased to produce a more stable result that has more latency. In another embodiment, when the head starts moving faster, the settings are biased towards less stabilization and no latency. The output of this step is a stabilized bounding box that reduces the frame to frame jitter from the object detector.

In one embodiment, the stabilized bounding box is then used by a feature predictor. In one embodiment, local binary features (LBF) is used for low end devices as it calculates faster but with less accuracy and Ensemble of regression trees (ERT) is used for devices with better processing capabilities as it is more accurate but computationally more expensive. The feature predictor initializes a mean shape of a face to the bounding box and then regresses this shape over multiple stages using the trained model to arrive at an estimation of the user's face. This shape is described by a number of points in 2D image space that align to key features of the face such as lips, eyes, nose etc.

In one embodiment, these points are then pushed through the modified one Euro filter to stabilize frame to frame jitter.

In one embodiment, four of the stabilized and aligned points, chosen specifically for their stability and potential to describe perspective, are then passed to a perspective N point solver along with an estimated 3D model of those points. This calculation then results in an affine transform which enables the placement and rendering of 3D geometry over a user's face.

In one embodiment, Vulkan is used a cross-platform renderer with MoltenVK used as a translation layer to Metal, the native renderer for iOS and macOS platforms.

In one embodiment, the renderer is multi-threaded and track based. Typically, the track for each element to be rendered is specified on the associated event in the EDL. In one embodiment, there is a specified compositing order where the track number acts as a layer number with track 1 being the bottom layer.

As each element that needs to be rendered is being generated by a DAG and the evaluation of every DAG is asynchronous, the data for each track to be rendered arrives to the renderer out of order. Accordingly, in one embodiment, a series of temporary buffers to complete some rendering and compositing is used while waiting for lower track numbers. These temporary buffers are then combined as the last step. This allows utilisation of the GPU in parallel to perform some rendering while the more computationally expensive DAGs are still evaluating.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
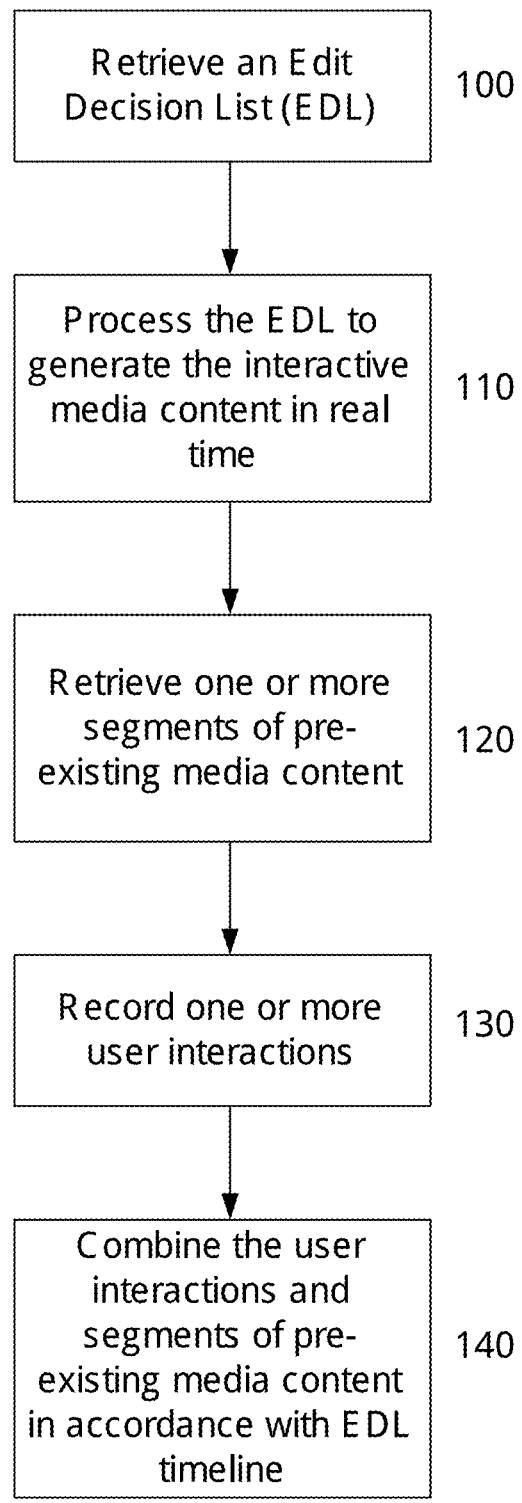
FIG. 1 is a flowchart of an example of a method for generating interactive media content on a portable electronic user device.

An example of a method for generating interactive media content on a portable electronic user device will now be described with reference to FIG. 1.

For the purpose of illustration, it is assumed that the process is performed at least in part using one or more electronic processing devices forming part of one or more processing systems, such as servers, personal computers, client devices, mobile phones, tablets or the like, and which may optionally be connected to one or more other processing systems, data sources or the like, via a network architecture, as will be described in more detail below. In one exemplary example, the process is performed using one or more processors residing in the portable electronic user device which is operable to execute application software (i.e. an App) having machine readable instructions which when executed by the processors cause the processors to perform the process. In this way, data is not required to be sent to a server or the cloud for processing and/or storage which is beneficial for interactive media content which is generated for use by children. By way of example, the process may be performed using the central processing unit (CPU) and graphics processing unit (GPU) of a mobile device such as a smart phone, tablet etc.

In this example, at step 100, the processing device retrieves an Edit Decision List (EDL), the EDL providing an event driven timeline for the interactive media content that defines events. Typically, user input is received via the user device indicative of a user selection of a type of interactive media content to be generated and the EDL is retrieved at least in part based on the user selection.

For example, multiple on-screen buttons may be presented within the application for the user to touch in order to select the desired type of interactive media. Multiple types of interactive media content may be available for selection including in categories such as stories, songs, movies, games etc. Once a type has been selected, the user may then be presented with further specific content available under each type. For example, if 'stories' is selected, the user may be presented with options such as stories involving different children's characters or based on different children's TV shows. Each unique instance of each type of interactive media content available for user selection has an associated EDL which defines how the interactive media content for that instance is to be constructed.

In particular, the EDL defines one or more segments of pre-existing media content to be used in the generation of the interactive media content and timestamps for when the one or more segments of pre-existing media content are to be introduced into the timeline and their associated duration. The EDL further defines one or more user interactions to be used in the generation of the interactive media content and timestamps for when the one or more user interactions are to be introduced into the timeline and their associated duration. The one or more user interactions are typically indicative of user generated media content, for example content recorded from a live feed of a camera of the user device which is spliced together with the one or more segments of pre-existing media content. The interactive media content therefore represents unique content that is constructed in accordance with the EDL, but which allows a user, in particular a child in one example, to interact with the content in a fun and exciting way.

At step 110, processing of the EDL occurs to generate the interactive media content in in real time. The generation process involves retrieving the one or more segments of pre-existing media content at step 120 for example from a local data store or library used by the application. The one or more user interactions are recorded at step 130 using a sensing device of the user device such as a camera or microphone. Finally, at step 140, the processing device combines the one or more recorded user interactions with the one or more segments of pre-existing media content in accordance with the event driven timeline of the EDL.

The above described method provides a number of advantages. Firstly, it enables a user to generate interactive media content in real time without needing to perform complex post-production video editing or the like on a desktop computer. It enables multiple forms of media to be combined in real time and includes the ability for user interaction to be included in the generated media content. Various video and audio feeds can be spliced together including live feeds from the camera of the user device. The EDL brings in unique pieces of media according to a timeline which defines when each segment of media is to be introduced. The concept of using an EDL for mobile devices is new as EDL's are traditionally used on desktop computers for post-production video or film editing. The use of an EDL for real time automated content creation is new and is a non-traditional use of an EDL.

Using an EDL also allows the system to prefetch and buffer only the relevant media content needed for a current time period. The ability to generate content in this way minimises memory required by the processor to produce the media content thereby allowing longer user experiences to be created compared to the combined videos that were generated in accordance with PCT/AU2016/050117.

A number of further features will now be described.

As previously discussed, the types of interactive media content to be generated may include one or more of stories, movies, songs, and, games. In one example, each of these categories relate to children's TV shows, movies, fictional characters and the like, although this is not intended to be limiting and content for teenagers or adults may comprise alternative types of interactive media content.

Typically, a plurality of instances of one or more types of interactive media content are available for user selection. For example, if a user selects 'stories', there may be a plurality of unique stories that may be selected for content generation. Furthermore, each instance has an associated EDL defining how the interactive media content is to be generated. Accordingly, the application typically stores a number of EDL files in memory for retrieval when required and in response to the user selection.

It will be appreciated therefore that each EDL is typically stored locally on the user device, although in other examples the EDL may be stored on a server or the like and the application retrieves the EDL from the server when needed in order to generate the content.

Typically, each instance is associated with one or more segments of pre-existing media content that are stored locally on the user device in a library of media segments or the like. The one or more segments of pre-existing media content may include one or more of video, audio, images, and, overlays and effects.

The one or more user interactions that may be combined into the generated interactive media content may take several forms. In one example, an interaction includes a video recording of the user.

In a particular example of a video recording interaction, the method further includes the processing device causing a camera of the user device to open to begin recording the user. Face tracking is then performed on the user's face via the camera and an augmented reality (AR) mask is applied or rendered to the user's face using results of the face tracking. Accordingly, in one example the video recording includes the AR mask applied to the user's face.

In this regard, the application is able to splice various video and audio feeds including live streams from the mobile device camera, apply overlays, effects and perform face tracking to render three dimensional (3D) content mapped to the user's face, which are all to be completed in real time.

In another example, the face tracking is used to overlay the AR mask onto a segment of pre-existing media content. For example, the AR mask may be overlaid onto a background image or over pre-existing video content. In either case, the AR mask will move about the screen in response to movement of the user's face which is being tracked in real time. In this regard, the application may call any suitable frame-based face tracking library such as Google Face, ARKit, opencv or dlib depending on the mobile device being used. Other effects such as audio, stickers, 'scenes' etc. may also be added to a media segment in accordance with the EDL.

In one example, the user can perform interactions via facial movements and gestures. For example, the method may include in the processing device: determining that a facial movement or gesture has been performed using the results of the face tracking; and, in response to determining that the facial movement or gesture has been performed, applying an effect to a current scene being generated. In this regard, the EDL may trigger a game environment which is responsive to facial gestures to provide an interactive game experience for the user. For example, the game may be to catch objects that are falling by poking your tongue out at the same time that the object passes the rendered tongue of the AR mask. Other effects and overlays such as audio, stickers etc. may be generated upon successful completion of tasks in the game environment.

In addition to video, the one or more user interactions may include an audio recording of the user recorded by a microphone of the user device.

Typically, the EDL defines at least one interaction cue at a pre-defined timestamp that prompts the user to perform an interaction via the user device. The interaction cue may have a pre-defined duration and could include one or more of: an on-screen button which is displayed to the user on the user device; an audio cue provided in a segment of pre-existing media content; and, a visual cue provided in a segment of pre-existing media content.

Typically, combining the one or more recorded user interactions with the one or more segments of pre-existing media includes one or more of: splicing the one or more user interactions between segments of pre-existing media content in accordance with the event driven timeline of the EDL; and, overlaying the one or more user interactions over one or more segments of pre-existing media content in accordance with the event driven timeline of the EDL.

In one example, overlaying the one or more user interactions over the one or more segments of pre-existing media content may include applying an audio or visual effect in sync with the time that the user performs the interaction. The audio or visual effect may be indicative of a reward for performing a successful interaction.

Typically, whilst multiple pre-existing video tracks are spliced together with the user interactions, the EDL includes a single pre-existing audio track that plays for the duration of the generated interactive media content. The video content is therefore to be synced with the audio layer when generating the content.

As previously discussed, in one example, the processing to generate the interactive media content is performed locally on the user device and additionally the generated interactive media content is stored locally on the user device for future playback.

Typically, the method includes in the one or more electronic processing devices simultaneously decoding one or more segments of pre-existing video content; reading data from a camera stream; encoding the data read from the camera stream to form a video clip for replay; and, performing face tracking on the user's face in the camera stream. Additionally, within the same time budget the method further includes applying an augmented reality (AR) mask to the user's face in accordance with results of the face tracking.

For user interactions that include recording video of the user, typically the user will have a slight delay in reaction time when the camera is turned on for them to perform an interaction (such as dancing, making gestures etc.). This delay in reaction time could lead to sync issues when the media content is recompiled as the previous pre-existing media content will finish and the content will cut to the video recording of the user before they have reacted. Accordingly, an offset is added to the EDL to account for user reaction time when performing an interaction to ensure that a user video recording is in sync with one or more segments of pre-existing media content. In this example, the offset is indicative of a delay between when the user video recording is initiated and when the video recording is spliced into the interactive media content being generated.

Typically, the method also includes displaying a representation of the interactive media content to the user on the user device as the content is being generated in real time.

In another broad aspect, there is provided system for generating interactive media content on a portable electronic user device, the system including one or more electronic processing devices configured to: receive a user input via the user device indicative of a user selection of a type of interactive media content to be generated; retrieve an Edit Decision List (EDL) based at least in part on the user selection, the EDL providing an event driven timeline for the interactive media content that defines events including: one or more segments of pre-existing media content to be used in the generation of the interactive media content; timestamps for when the one or more segments of pre-existing media content are to be introduced into the timeline and their associated duration; one or more user interactions to be used in the generation of the interactive media content; and, timestamps for when one or more user interactions are to be introduced into the timeline and their associated duration; and, process the EDL to generate the interactive media content in real time by: retrieving the one or more segments of pre-existing media content; recording the one or more user interactions using a sensing device of the user device; and, combining the one or more recorded user interactions with the one or more segments of pre-existing media content in accordance with the event driven timeline of the EDL.

Typically, the interactive media content is generated by application software executing on the user device. In this regard, the application software typically includes a mobile video engine for use in generating the interactive media content.

Preferably, all data storage and processing occurs on the user's mobile device, although of course in some examples processing could occur on a server for example in the cloud. In this regard, the user device will typically include a data store or memory for storing the EDL files, the one or more segments of pre-existing media content (i.e. media files in formats such as PNG, TIFF, MP3, MP4, AVI, MOV, AAC, WAV etc.) and the generated interactive media content which is saved for playback on the user device.

In another broad aspect, there is provided a mobile video engine for use in generating interactive media content on a portable electronic user device, the mobile video engine including computer executable code, which when executed by at least one suitably programmed electronic processing device causes the at least one processing device to: retrieve an Edit Decision List (EDL), the EDL providing an event driven timeline for the interactive media content that defines events including: one or more segments of pre-existing media content to be used in the generation of the interactive media content; timestamps for when the one or more segments of pre-existing media are to be introduced into the timeline and their associated duration; one or more user interactions to be used in the generation of the interactive media content; and, timestamps for when the one or more user interactions are to be introduced into the timeline and their associated duration; and, process the EDL to generate the interactive media content in real time by: retrieving the one or more segments of pre-existing media content; recording the one or more user interactions using a sensing device of the user device; and, combining the one or more recorded user interactions with the one or more segments of pre-existing media content in accordance with the event driven timeline of the EDL.

Typically, the mobile video engine processing is performed locally on the user device.

Typically, at least one event associated with a user interaction involves the mobile video engine causing the at least one processor to: cause a camera of the user device to open; perform face tracking on the user's face via the camera; and, apply an augmented reality (AR) mask to the user's face using results of the face tracking.

Preferably, the mobile video engine causes a representation of the generated interactive media content to be displayed on a display of the user device in real time as the content is being generated.

The mobile video engine behind the interactive application is able combine multiple forms of media in real time. In at least some embodiments, the mobile video engine is configured to:

- splice together various video feeds based on an Edit Decision List (EDL);
- synchronise background audio according to the recorded video feed;
- perform real-time facial analysis which tracks the movement of facial features (e.g. eyes, mouth and tongue) and render 3D content that is mapped over the user's face;
- display this information locally on a mobile device without requiring a server, and
- be performant across all device platforms (e.g. iOS, Android, etc.) by being flexible in its access to the central processing and graphics processing unit (CPU and GPU respectively) to allow different parts of the application to run, and,
- enable other applications to remain running unaffected in the background.

As previously described, the mobile video engine processing and video playback is typically performed locally on the user device. This makes the App safe for children to use as no data needs to be sent or uploaded to a server and all content is rendered locally on the mobile device. However, in other arrangements, and for other user demographics such as adults, some or all processing may occur remotely on other processing systems in communication with the user device as will now be described.

Figure 2:
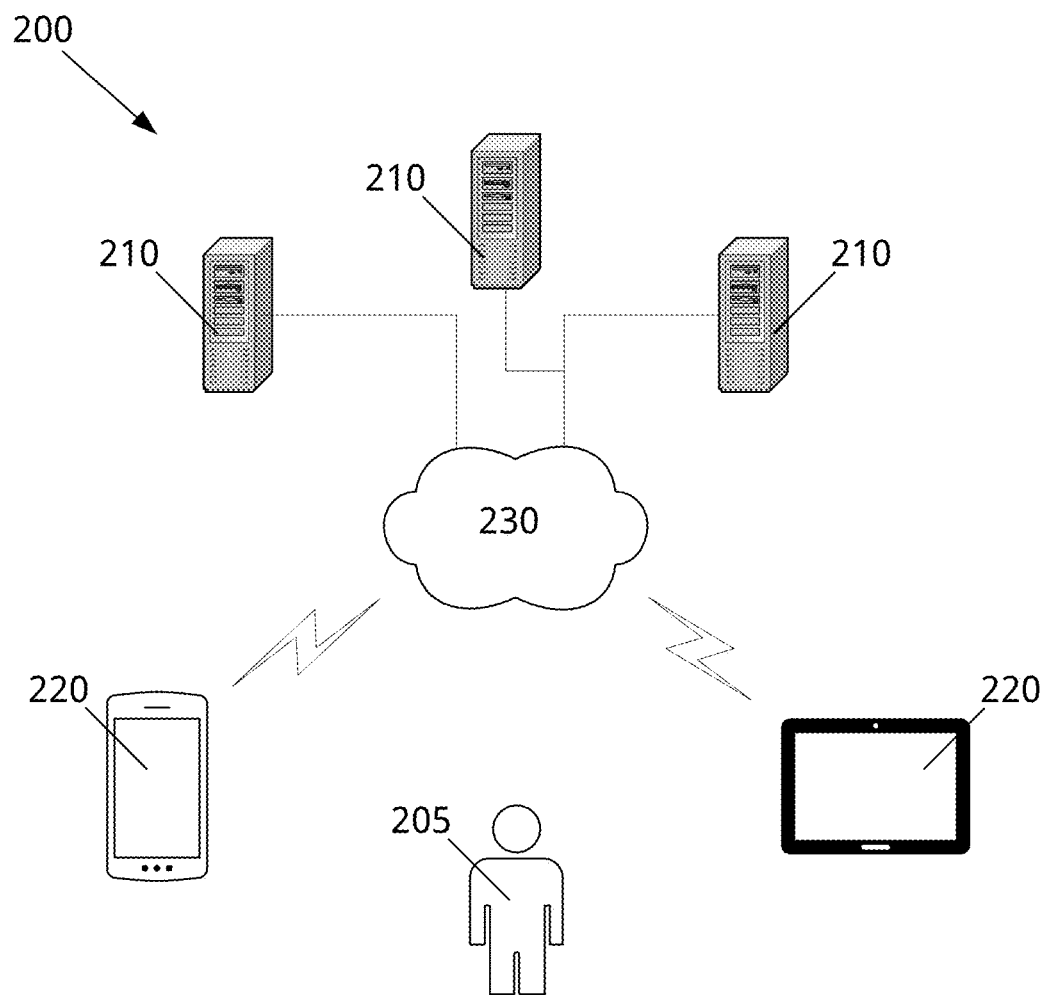
FIG. 2 is a schematic diagram of an example of a distributed computer architecture.

In one example, the processes are performed by one or more processing systems operating as part of a distributed architecture, an example of which will now be described with reference to FIG. 2.

In this example, a number of processing systems 210 are provided coupled to one or more portable electronic devices 220, via one or more communications networks 230, such as the Internet, and/or a number of local area networks (LANs).

Any number of processing systems 210 and portable electronic devices 220 could be provided, and the current representation is for the purpose of illustration only. The configuration of the networks 230 is also for the purpose of example only, and in practice the processing systems 210 and portable electronic devices 220 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In this example, the processing systems 210 are adapted to perform tasks such as retrieving EDL's in response to user input, sending EDL's to the portable electronic device 220, optionally providing the pre-existing media content to the portable electronic device 220 and re-compiling the generated interactive media content for playback on the portable electronic device 220. Whilst the processing systems 210 are shown as single entities, it will be appreciated they could include a number of processing systems distributed over a number of geographically separate locations, for example as part of a cloud-based environment. Thus, the above described arrangements are not essential and other suitable configurations could be used.

Figure 3:
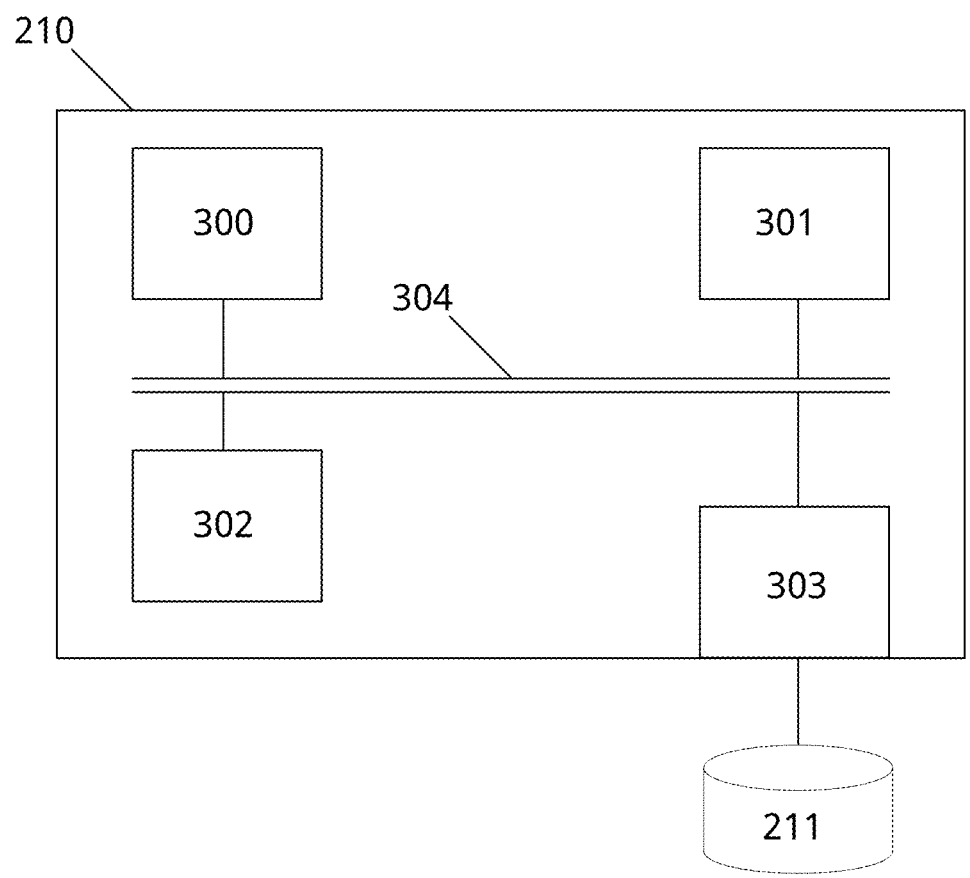
FIG. 3 is a schematic diagram of an example of a processing system of FIG. 2.

An example of a suitable processing system 210 is shown in FIG. 3. In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications networks 230, databases 211, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing system 210 may be formed from any suitable processing system, such as a suitably programmed PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
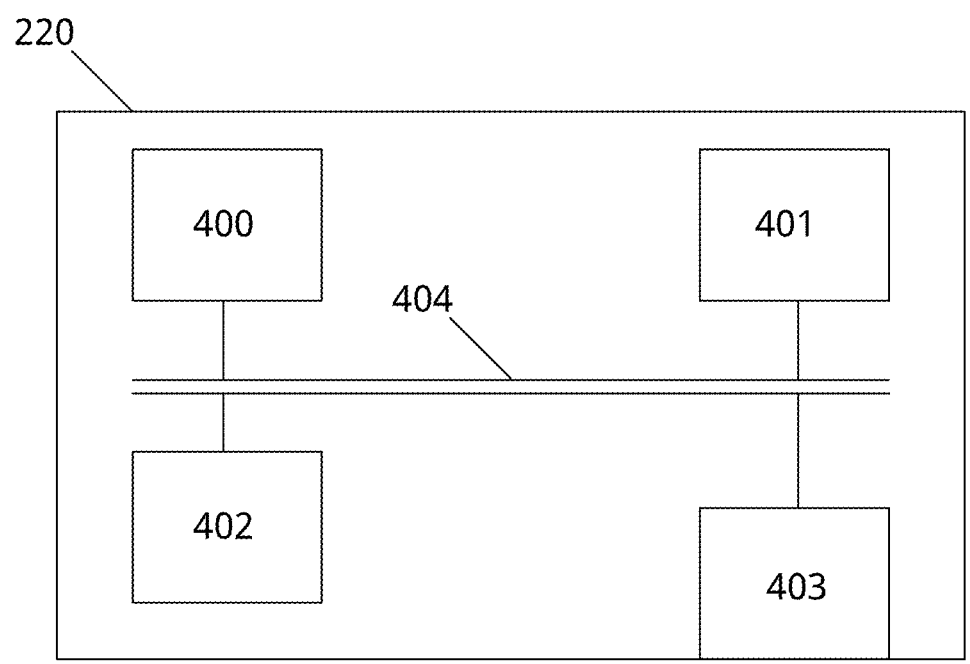
FIG. 4 is a schematic diagram of an example of a portable electronic user device of FIG. 2.
Figure 5A:
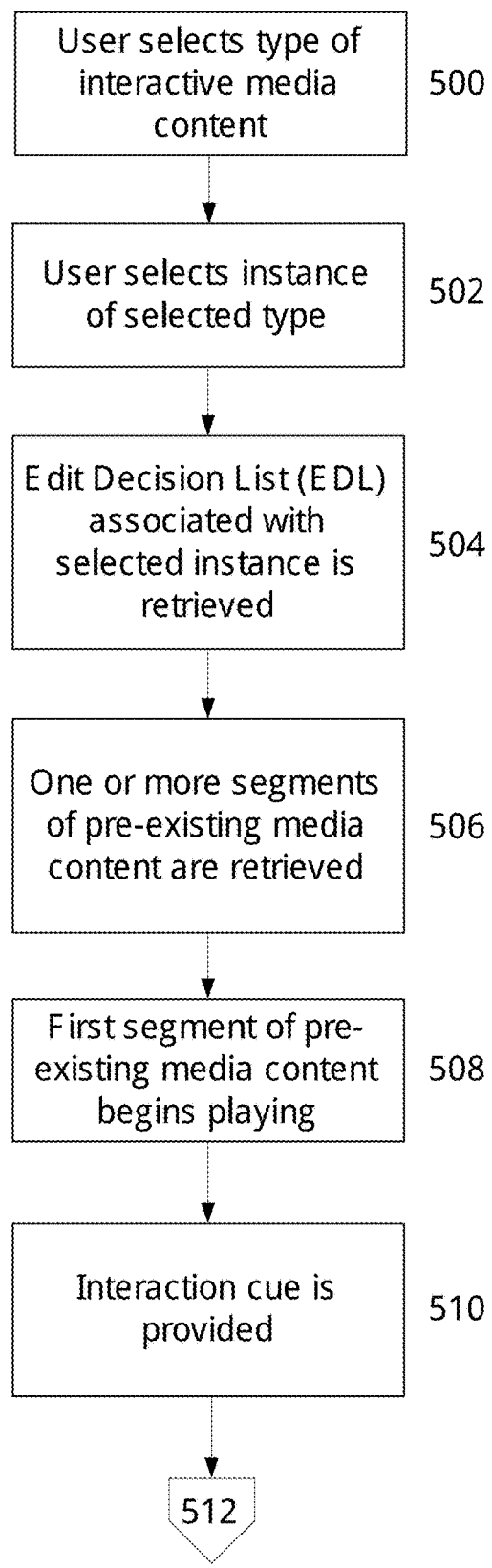
FIGS. 5A to 5E are a flowchart of a specific example of a process for generating interactive media content on a portable electronic user device.
Figure 5B:
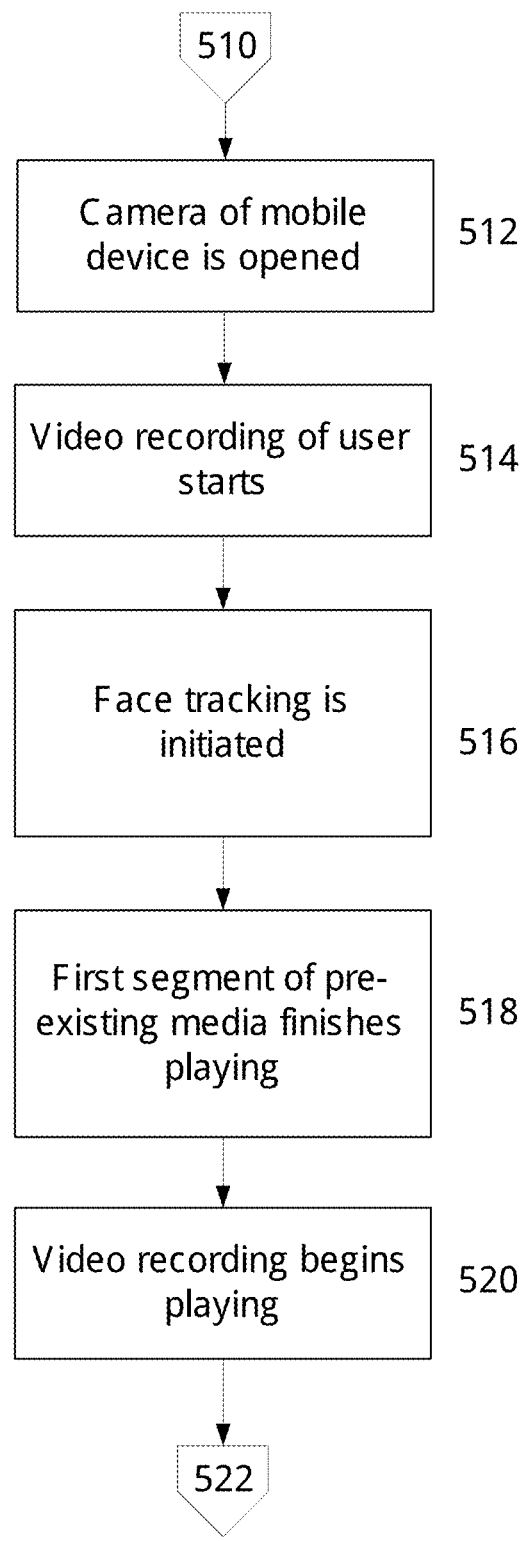
Figure 5C:
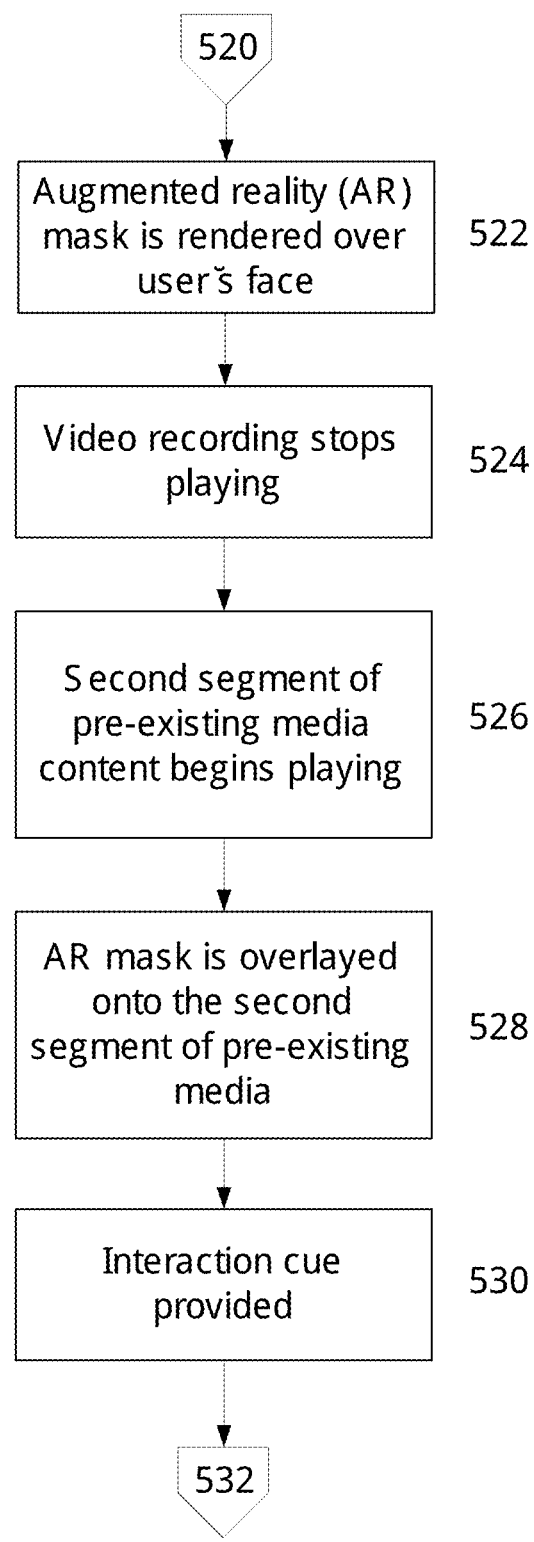
Figure 5D:
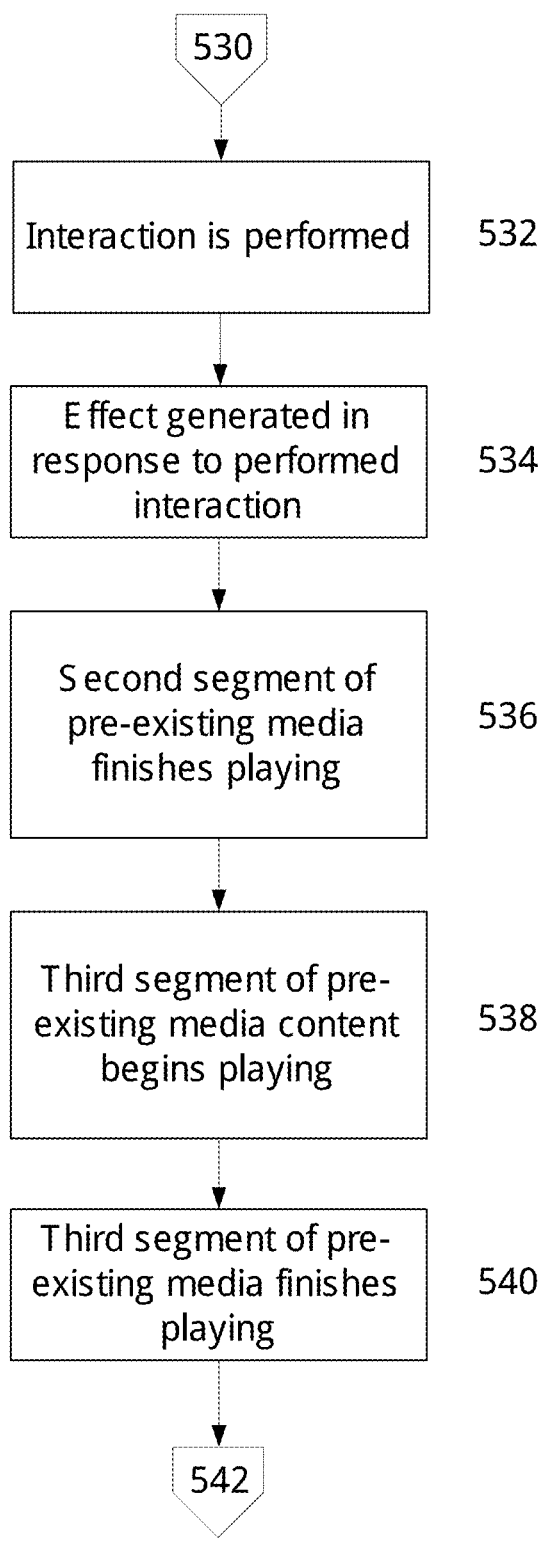
Figure 5E:
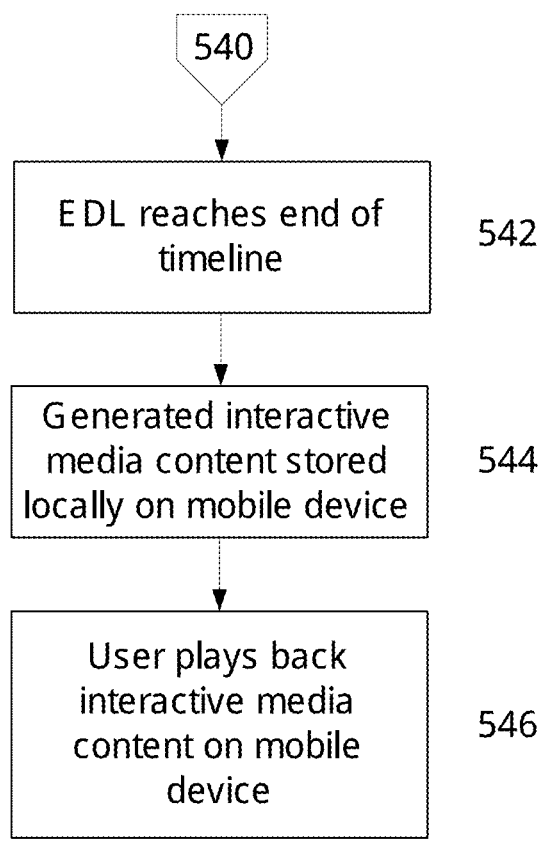

As shown in FIG. 4, in one example, the portable electronic device 220 includes at least one microprocessor 400, a memory 401, an input/output device 402, such as a keyboard and/or display, and an external interface 403, interconnected via a bus 404 as shown. In this example the external interface 403 can be utilised for connecting the user device 220 to peripheral devices, such as the communications networks 230, databases, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401, and to allow communication with one or more of the processing systems 210.

Accordingly, it will be appreciated that the portable electronic device 220 may be formed from any suitably programmed processing system and could include lap-tops, or a hand-held PC, a tablet, a smart phone, or the like. Preferably, the portable electronic device 220 is a mobile phone or tablet capable of downloading application software for example from an App store such as Google Play, Amazon App Store, Apple App Store etc. depending on the device platform. However, it will also be understood that the portable electronic device 220 can be any electronic processing device such as a microprocessor, microchip processor, logic gate configuration, firmware optionally associated with implementing logic such as an FPGA (Field Programmable Gate Array), or any other electronic device, system or arrangement.

A specific example of a process for generating interactive media content on a portable electronic user device shall now be described with reference to FIGS. 5A to 5E. For the purpose of this example, it is assumed that processing system 210 is a server that has no involvement in the process apart from being accessed initially to download the applications software to the portable electronic user device 220. It is to be assumed that actions performed by the portable electronic user device 220 are performed by the processor 400 in accordance with instructions stored as applications software in the memory 401 and/or input commands received from a user via the I/O device 402.

In this example, after the user has launched the application, an interface will typically be presented allowing the user to select various options for the type of interactive media content that they wish to generate. For example, options may be presented to generate 'stories', 'movies', 'songs' etc. At step 500, the user selects the type of content to be generated.

At step 502, the user selects an instance of the type of content to be generated. For example, if 'stories' are selected, then a screen may appear prompting the user to select a particular type of story relating for example to a favourite TV show or children's character.

Based on the user selection, the user device 220 then retrieves the EDL associated with the selected instance at step 504 (for example by retrieving an EDL file from memory 401 of the user device). The EDL will specify the one or more segments of pre-existing media that are required and at least the first segment of pre-existing media called by the EDL is retrieved from memory at step 506. At step 508, the first segment of pre-existing media is decoded and begins playing which starts the content creation.

In this example, at step 510 an interaction cue is provided. This may be an audio or visual cue provided in the pre-existing media segment or it may be a separate cue which is triggered by the EDL. The interaction cue will cue the user to get ready to perform a certain interaction. At step 512, the application will open the user's front facing camera and begin reading data from the camera stream and recording the user at step 514. Once recording begins, the data from the camera stream is encoded to produce a video or movie file for playback.

In this example, at step 516 the application initiates face tracking on the camera stream to begin tracking movement of the user's face and position of facial features and the like. At this point, the content rendered may still be the pre-existing media content which continues playing for a period after the video recording is initiated to account for a delay in user reaction time when the camera begins filming them. Accordingly, at step 518 the first segment of pre-existing media content finishes playing and the video recording of the user is inserted into the content at step 520.

At step 522, the face tracking calculations are used to render an AR mask over the user's face and accordingly the generated content includes video recording of the user with an AR mask following their face/head movements. At step 524, the EDL triggers the user video to stop playing and a second segment of pre-existing media content is retrieved by the EDL and begins playing at step 526. In this example, at step 528, the video recording and face tracking which is still occurring in the background is used to overlay the AR mask rendered over the user's face onto the second segment of pre-existing media content which could be a background image or alternatively a video stream.

At step 530, another interaction cue is provided which could be an audio cue to perform a certain interaction which could for example be a facial gesture such as the user poking their tongue out or opening their mouth. At step 532, the interaction is performed and at step 534 an effect may be generated in response to the performed interaction. In this regard, in one example, the EDL may trigger a game environment which allows the user to perform interactions and in response to successful interactions renders certain content on the screen. For example, the game may be to catch a falling object which the user can do by poking their tongue out as the object passes their tongue on the screen. If successful, the object may disappear, and an effect may be rendered such as a sound or an overlay.

At step 536, the second segment of pre-existing media finishes playing and this is immediately followed by a third segment of pre-existing media which the EDL fetches and which begins playing at step 538. At step 540, the third segment of pre-existing media finishes playing and at step 542 the EDL reaches the end of its timeline and the generation of the interactive media content is completed. The generated content is stored locally on the user device for playback at step 544. At step 546, in response to the user requesting playback, the processor recompiles the stored content for playback on the user's mobile device.

Figure 6:
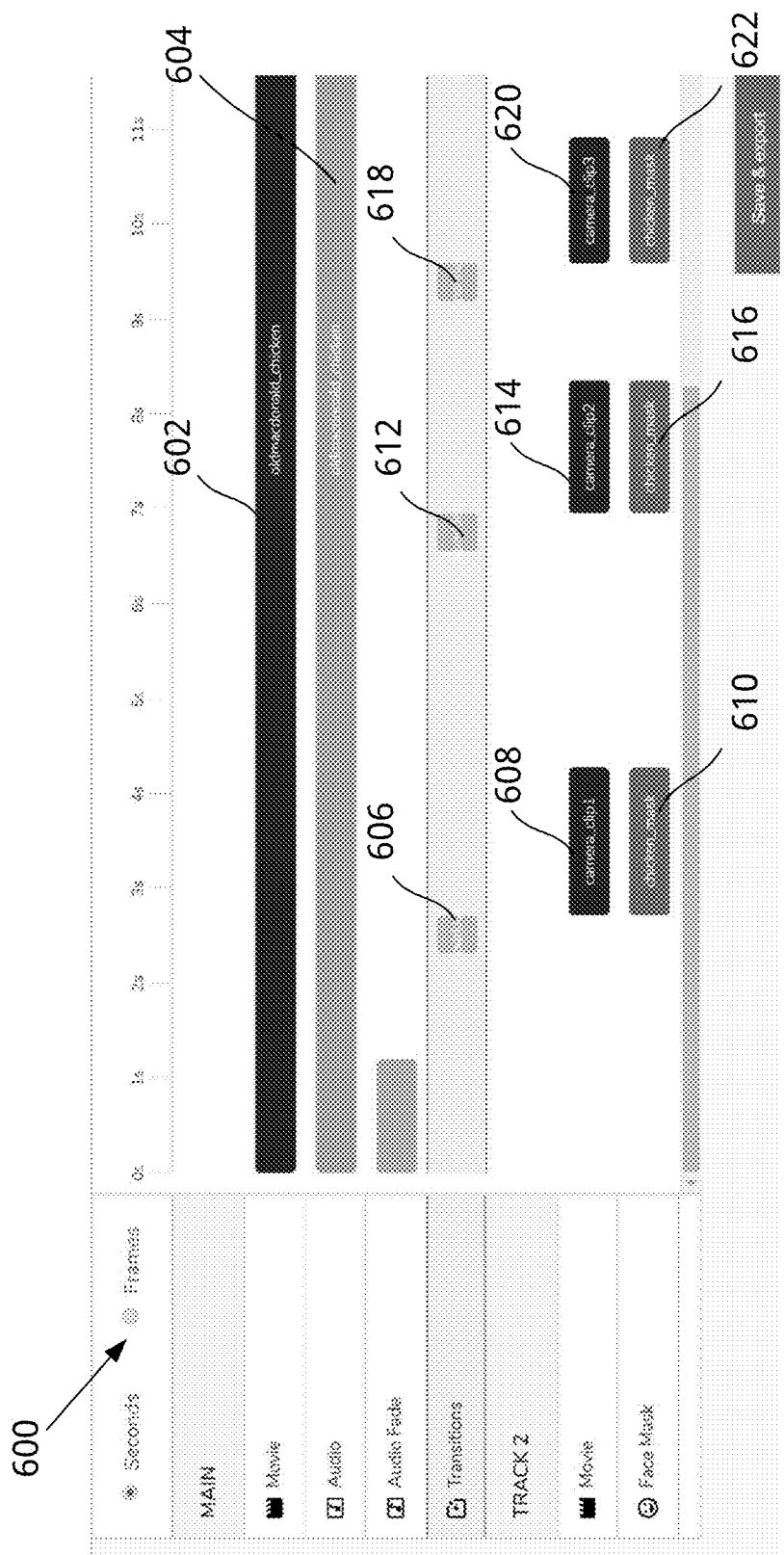
FIG. 6 is a schematic diagram of an example of an Edit Decision List (EDL) for use in generating interactive media content.

Referring now to FIG. 6, an example of a structure of an EDL 600 is shown as produced in a suitable content management system (CMS). In this example, there is a movie track 602 and audio track 604 which plays through the duration of the content. A number of user interaction cues 606, 612, 618 are triggered at various timestamps for prompting the user to perform an interaction. The EDL triggers camera clips 608, 614, 620 indicative of recordings of the user which are spliced into the content at their respective timestamps and for their respective durations. In this example, the EDL further calls an AR mask 610, 616, 622 which is to be rendered over the user's face in accordance with a face tracking algorithm which is used to calculate the position and orientation of the user's face in real time. The AR masks are applied over the user's face in the camera clips 608, 614, 620 which are spliced into the movie track 602 at times driven by the EDL. Whilst a single video track 602 is shown in this EDL 600, this is for example only and typically a plurality of video track segments will be used to construct the interactive media content, each segment being called and buffered as needed for insertion into the content.

FIGS. 7A to 7J provide a series of screenshots of application software running on a mobile device that illustrate the real time generation of interactive media content.

Figure 7A:
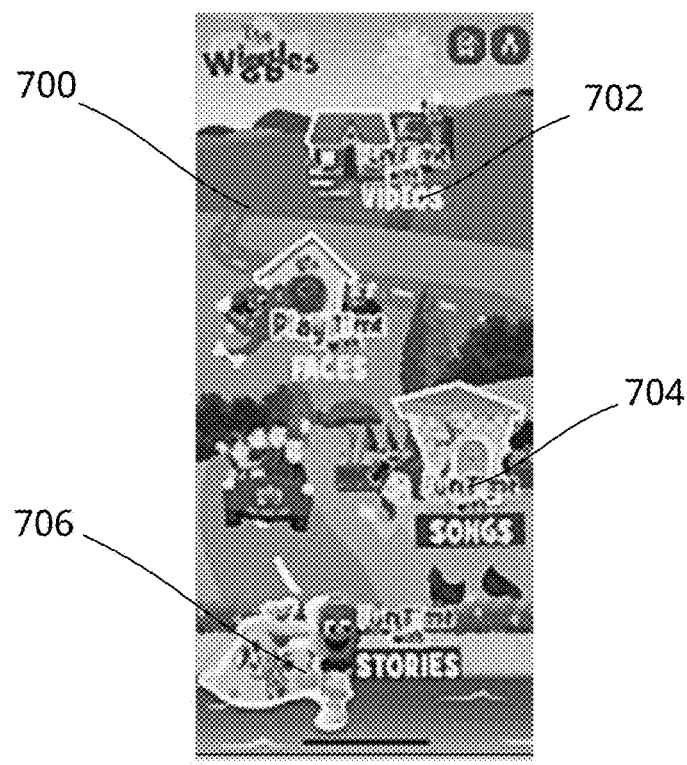
FIGS. 7A to 7J provide a series of screenshots of application software running on a mobile device that illustrate the real time generation of interactive media content.
Figure 7B:
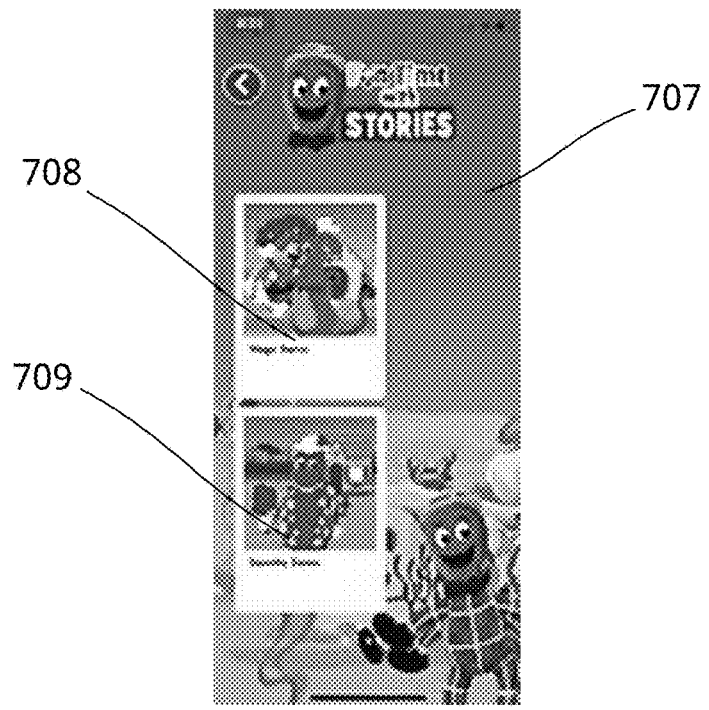

In FIG. 7A there is shown a screen 700 which presents to the user a number of selectable options for different types of interactive media content that the App can generate. For example, the user can select from 'videos' 702, 'songs' 704 and 'stories' 706. In FIG. 7B, in response to the user selecting 'stories', a 'stories' screen 707 appears with options of selecting instances 708, 709 of stories that are available for content generation.

Figure 7C:
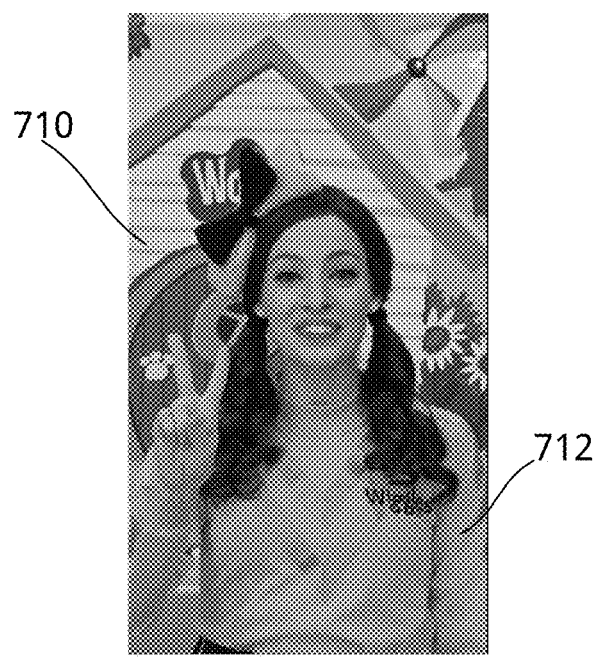
Figure 7D:
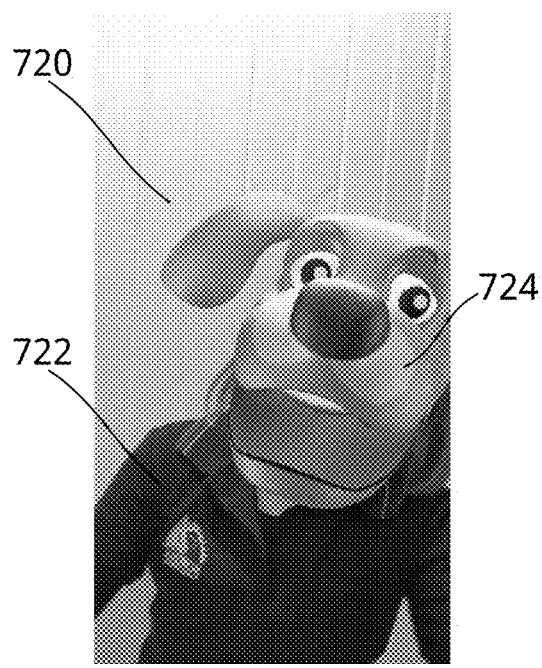

In response to selecting 'story' 708, the content generation is initiated and a first segment of pre-existing media 710 begins playing featuring a performer or character 712 performing or otherwise entertaining the user as shown in FIG. 7C. FIG. 7D shows a video recording 720 of a user 722 with an AR mask 724 rendered over the user's face in accordance with a face tracking algorithm that the app initiates. This video recording is spliced into the 'story' following the first segment of pre-existing media 710.

Figure 7E:
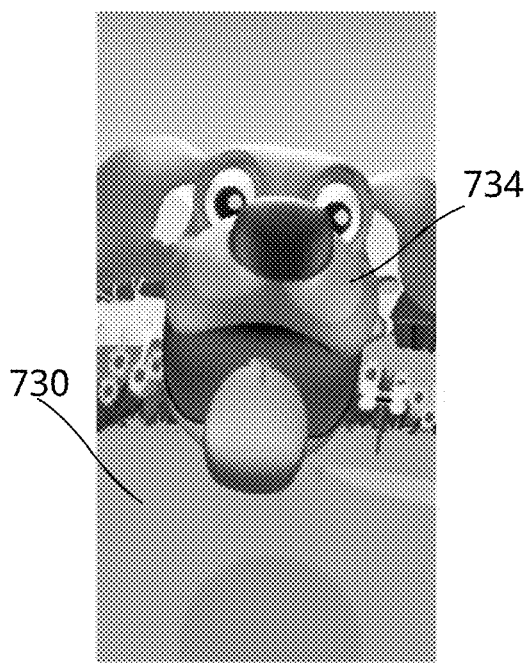
Figure 7F:
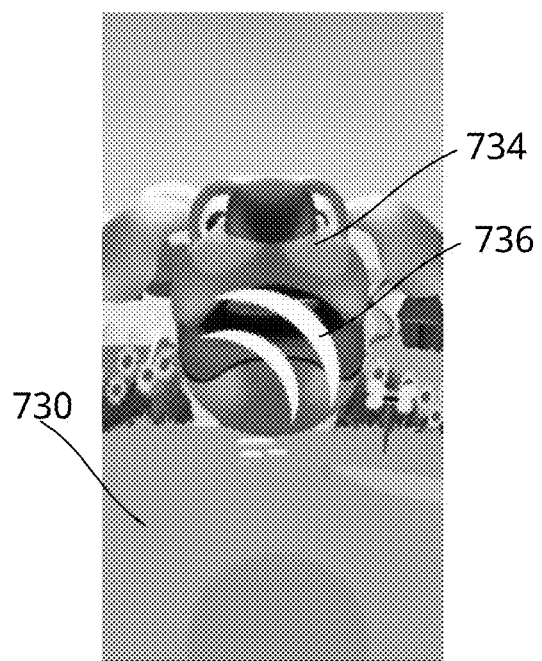

In FIG. 7E, the story then includes a second piece of pre-existing media 730 which in this example is a background image (audio is playing throughout). An AR mask 734 of the user is overlaid onto the background using the camera video stream and face tracking which is continuously being used. In FIG. 7F, an interaction is performed whereby the user is instructed to open their mouth and in response to the successful interaction a visual representation of a sound is overlaid onto the mouth of the AR mask. Typically, this would be in sync with the audio track which at the same time may produce a sound effect.

Figure 7G:
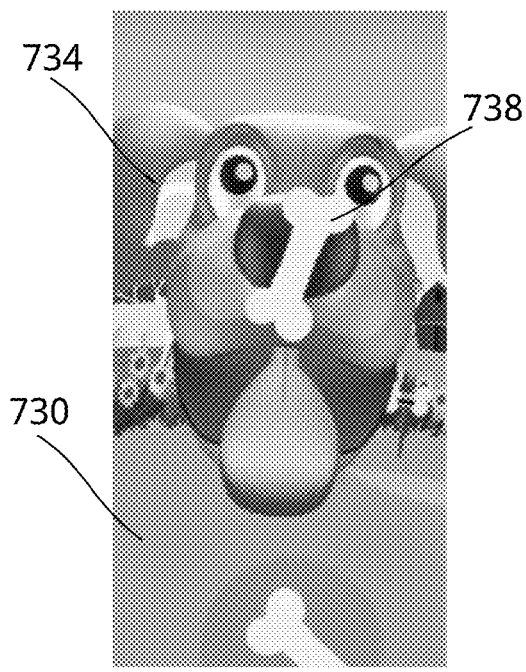
Figure 7H:
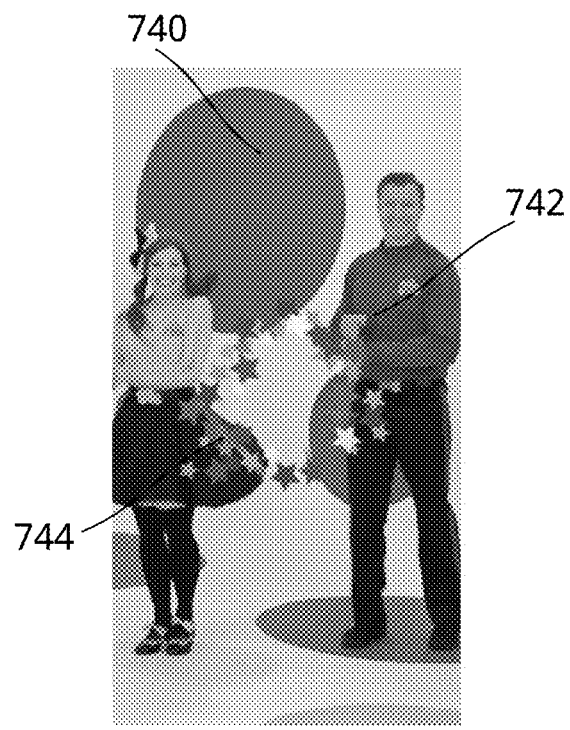
Figure 7I:
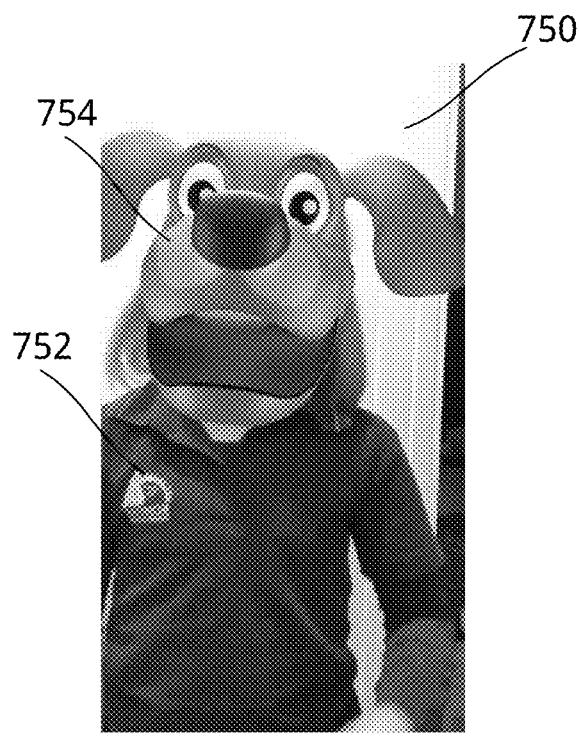
Figure 7J:
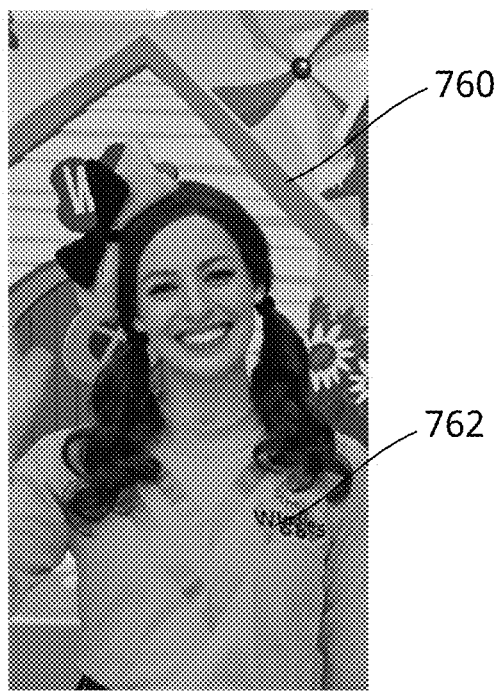

In FIG. 7G, a game environment is initiated which involves the user performing interactions such as poking their tongue out to collect 'bones' as they are falling. A successful interaction may result in the bone disappearing and being replaced by a 'star' or other reward effect which is overlaid onto the screen 730. In FIG. 7H, another segment of pre-existing media 740 begins playing featuring performers or characters 742 dancing on the screen. A visual interaction cue 744 is provided in the form of 'sparkles' which prompt the user that it is their turn to dance or sing along. The camera then turns back onto the user and a video or movie clip 750 is generated of the user 752 with AR mask overlay 745 dancing or singing along as shown in FIG. 7I. This video or movie clip 750 is spliced into the media content after the previous segment of pre-existing media content. Finally, in FIG. 7J, the final segment of pre-existing media content 760 is inserted into the generated media content with the performer 762 concluding the story.

Further detail of the technical implementation of the mobile video engine shall now be described.

In one example, the mobile application is required to combine the following sources of media inputs synchronously: pre-recorded video (in this case, a Wiggles music video), audio (i.e. song) that matches the pre-recorded video and live video captured from the user's device, which will be overlaid with augmented reality (AR) effects based on facial analysis (i.e. mathematical detection and mapping of facial components such as eyes, mouth and tongue movement).

In this regard, the mobile video engine driving the interactive non-linear video system has been designed to:
- splice multiple types of media (i.e. pre-recorded video, live video capture with overlaid AR effects, and audio, and recombine each of these concurrently to display a synchronous video by using an EDL to bring unique pieces of media according to a timeline determined by the mobile video engine;
- draw upon the central processing unit (CPU) and graphics processing unit (GPU) of mobile devices (Android and iOS) that are allocated to the application and adapting to the impact on performance of other applications operating in the background (e.g. social media applications, YouTube);
- flexibly transfer and allocate CPU and GPU power to the different types of multimedia sources required for processing and display to the user without affecting audio quality or timing.

An interactive non-linear video system for mobile devices on both iOS and Android platforms has therefore been developed that is capable of accurately rendering AR effects on mapped facial features from live video feed where each frame of media output must be processed with the following in under 40 milliseconds at a rate of 25 frames per second (fps):
- transition to a prepared source of media;
- synchronise video and audio from a single source of media;
- perform facial analysis; and
- processes facial analysis output into a 3D affine transform.

The mobile video engine is capable of adapting performance output of the composite video, AR and audio based on the apportioned CPU and GPU resources being ready and available for use without affecting audio quality or dropping audio frames. Furthermore, the mobile video engine can dynamically balance and prioritise work consistently for each frame of media output in devices whereby the performance of the hardware and firmware is equal or greater than the iPhone 6.

To develop the above performance, the mobile video engine was required to achieve the following technical outputs on a variety of devices with distinct hardware and firmware:
- Synchronise video and audio from a single source of media in under 10 milliseconds;
- Transition to a prepared source of media in under 1 millisecond;
- Perform facial analysis in under 15 milliseconds;
- Process facial analysis output into a 3D affine transform in under 1 millisecond, and,
- Composite and render video with 3D meshes in under 10 milliseconds.

The mobile video engine, an interactive non-linear video editing system that splices different media sources—recorded video, live video feed with augmented reality, and background audio—can accurately synchronise each media component on a smart phone within 40 milliseconds per frame, at a rate of 25 fps, for minutes at a time while running facial analysis on the user's face.

In one example, in order to synchronise video and audio from a single source of media in under 10 milliseconds as well as to transition to a prepared source of media in under 1 ms, a multi-threaded asset loading system that orchestrates CPU/GPU resources was developed. The multi-threaded approach allows the mobile video engine to asynchronously process all the individual steps to splice video and audio media, camera media, and processing of facial analysis as expressed in an EDL across a large range of mobile devices with varying performance characteristics and operating systems. The multi-threaded asset loading system enables efficient utilisation of CPU/GPU, even when operating concurrently during highly intensive workload (e.g. from background applications) trying to decode video at sub second speeds in order to minimise loading times.

In transitioning to a prepared source of media, it was observed that decoding video in software was too slow, and the orchestration of CPU/GPU resources were inefficient in minimising video load times. For example, the mobile video engine stopped the video from playing on the Google Pixel XL (Android platform) because of deficiencies observed in the video decoder algorithm and MPEG-4 demuxer, i.e. demultiplexing of media files into individual elementary streams (e.g. audio, video, subtitles, etc.). In order to address this problem, a hardware decoder accelerator was integrated with the mobile video engine to increase visualisation speed in complex graphical environments. Dependency graph architecture was also developed that is capable of loading video dynamically with the available CPU/GPU resources.

The mobile video engine further includes a read-ahead buffer that stores prepared sources of media that can be transitioned in under 1 millisecond within the memory limits of mobile devices. The buffer size of multiple devices (with memory stores of various limitations) was tested to evaluate the efficacy of the mobile video engine. It was observed that the algorithm was inconsistent in its performance; for example, the uncached memory buffer for camera feed caused the mobile video engine on the Samsung S9 (Android platform) to run slowly. Subsequent development and testing led to a configuration that minimised frame drops while consuming a smaller portion of memory by reading the entire cache line (i.e. the unit of data transfer between cache and memory). The read-ahead buffer storage can therefore effectively manage hardware constraints across different iOS and Android devices (both hardware and firmware), such as CPU/GPU and memory, to achieve transition of source media in under 1 ms.

In one example, the mobile video engine includes the following components: a playback driver, a playback scheduler, a frame scheduler and an EDL runner. As previously described, the main input to the video engine is an EDL which specifies a series of events that need to occur at specific times during playback. The interactions between the above-mentioned components of the mobile video engine consist of the following steps that are broken down into an initialisation stage, a buffering stage and a playback stage.

In the initialisation stage, the playback driver is created which in turn creates the remaining components. The playback driver is then given an EDL to play.

In the buffering stage, the EDL is passed to the EDL runner. The EDL runner begins processing the EDL in a separate thread and is in effect looking ahead for events to buffer. Once an event is found that needs buffering, it passes the event to the playback scheduler. In a separate thread again, the playback scheduler then deconstructs the event into all the required work units (henceforth referred to as directed acyclic graphs or DAGs) and initializes them. The initialization could involve loading resources such as movie files, images, etc. from disk.

It is to be understood that an event can require multiple pieces of work to be completed in order to complete what the event describes. For example, an event might be to present the camera feed to screen. This event may be broken down into reading from the camera stream and displaying it, as well as recording the stream to an mp4. Each of these tasks is performed by a separate directed acyclic graph (DAG) which in turn is built from one or more computational components that takes an input and produces an output, i.e. reading from the camera is one component and this component produces a camera frame as an output. The camera frame then becomes the input to the display component which renders the camera frame.

The next step in the buffering phase once the DAGs have been initialized, is to pass them to the frame scheduler that places these work units in a pending queue. Once enough DAGs have been produced or buffered, a signal is sent that playback can commence. It should be understood that the buffer size is typically determined by the host device's capabilities. For example, a low-end iPhone will have a smaller buffer.

In the playback phase, the frame scheduler places any pending work units from the pending queue into the active queue at the specified time. For every frame to be rendered, the frame scheduler passes a list of active work units to be evaluated for that frame to the playback driver. The playback driver then distributes each work unit to a thread pool for evaluation. The results of work units are then rendered, composited, and presented to the device's screen. In the case of audio, the audio is mixed and output through the device's speakers. Once a work unit has exceeded its specified duration (as specified by the event in the EDL), it is removed from the active list and all resources it used are freed.

In one example, in order for the mobile video engine to perform facial analysis in under 15 ms, techniques based on Pixel Intensity Comparisons-based Object (PICO) detection and Local Binary Features (LBF) for facial alignment are combined.

In order to explain this further, it is to be appreciated that an event is used in the EDL to specify that face tracking should occur. The face tracking task is a DAG and uses a variety of computational components whose outputs combine to produce an affine transform that is used to render a piece of 3D geometry on the user's face.

The first component is an object detector and in one example, a modified version of the PICO algorithm is used to perform this task. This algorithm is a variation of the original Viola-Jones algorithm in that it uses a sliding window approach to scan the image. Each window is then checked if there is a face inside it. To reduce processing time, the algorithm was modified so that a batch of windows is distributed to a thread pool to be evaluated asynchronously. This resulted in a reduction of processing time by about 30-40%. The output of this step is a bounding box that encompasses the user's face.

This bounding box is then fed into a modified version of the one Euro filter which is an algorithm for filtering real-time noisy signals. The modification enables the parameters of the filter to be altered based on the estimated velocity of the head movement. When the head is moving slowly, the settings are biased to produce a more stable result but has more latency. When the head starts moving, the settings are biased towards less stabilization and no latency. The output of this step is a stabilized bounding box that has reduced the frame to frame jitter from the object detector.

The stabilized bounding box is then used by the feature predictor. Depending on the device, different algorithms may be used. For example, local binary features (LBF) may be used for low end devices as it calculates faster but with less accuracy and Ensemble of regression trees (ERT) may be used for devices with better processing capabilities as it is more accurate but computationally more expensive. The job of the feature predictor is to initialize a mean shape of a face to the bounding box and then regress this shape over multiple stages using the trained model to arrive at an estimation of the user's face. This shape is described by a number of points in 2D image space that align to key features of the face such as lips, eyes, nose etc.

These points are then pushed through the modified one Euro filter to stabilize frame to frame jitter. Four of the stabilized and aligned points, chosen specifically for their stability and potential to describe perspective, are then passed to a perspective N point solver along with an estimated 3D model of those points. This calculation then results in an affine transform which enables the placement and rendering of 3D geometry over a user's face.

In this way, the mobile video engine is able to process facial analysis output into a 3D affine transform in under 1 ms. A custom perspective n-solver was developed and its performance was evaluated based on processing time. In order to improve stability of the affine matrix generation over consecutive frames, in one example, a Kalman filter was implemented as a means to reduce variance to the estimated affine parameters. In this way, the expected feature positions are constrained from frame to frame, which improves stability of facial feature tracking through an image sequence. As a result, it is now possible to track and estimate facial feature poses in real-time image sequences on Android and iOS devices of various performance capabilities.

In one example, to composite and render video with 3D meshes in under 10 ms on both iOS and Android devices, a low-overhead, cross-platform 3D graphics and computing API (not iOS specific) with an integrated "Metal translation layer" (compatible with iOS) is used. This solution is able to correctly render 3D imagery within 10 ms across a range of iOS and Android mobile devices.

More specifically, in one example, Vulkan is used as the cross-platform renderer. However, iOS and macOS have no native support for Vulkan so MoltenVK is used as a translation layer to Metal, the native renderer for those platforms. The renderer is multi-threaded and is track based. The track for each element to be rendered is specified on the associated event in the EDL. In one example, there is a specified compositing order where the track number acts as a layer number with track 1 being the bottom layer. Track 2 is then composited on top of track 1 etc.

As each element that needs to be rendered is being generated by a DAG and the evaluation of every DAG is asynchronous, the data for each track to be rendered arrives to the renderer out of order. A series of temporary buffers are used to complete some rendering and compositing while waiting for lower track numbers. These temporary buffers are then combined as the last step. This allows utilisation of the GPU in parallel to perform some rendering while the more computationally expensive DAGs are still evaluating.

To illustrate this with an example, Track 1 is the camera, Track 2 is the face mask and Track 3 is some particles. Track 3 arrives at the renderer first, and this is rendered to a temporary buffer on the GPU while Track 1 and 2 are still being processed on the CPU. Track 1 arrives and is rendered to the main buffer on the GPU. Track 2 is still being processed on the CPU. Track 2 arrives and is rendered and composited directly onto the main buffer (on top of track 1). Track 3 is then composited onto the main buffer as the top layer. The number of temporary render buffers is dictated by the devices memory and GPU capabilities. The above is compared to waiting for all DAGs to finish before beginning any rendering.

Accordingly, in at least one example, there is provided a method and system for generating interactive media content on a portable electronic user device such as mobile phone or tablet device. The content may be generated and compiled in real time and provide multiple interactions with the user which enables them to star as performers alongside their favourite TV show characters or performers. The novel use of an EDL for mobile devices for automated media content generation enables the content to be fetched and buffered only as required which reduces memory requirements thereby enabling longer interactive user experiences to be created (for example several minutes rather than several seconds as was a limitation with prior art methods of content generation). The ability to perform all processing and have all data storage on the mobile device also ensures the safety of children using the App as their data and content does not need to be uploaded onto the cloud or other server processing system.

The mobile video engine which enables this technology is an interactive non-linear video engine that can combine multiple sources of media in real time. The engine is able to splice various video and audio feeds, including live feeds from the camera of a user device. It is also able to apply overlays, effects and perform real time face tracking to render 3D content mapped to a user's face. The engine is able to compile all of this in real time, locally on the mobile device and is performant on older generation phones. The video engines uses an EDL which brings in unique pieces of media according to a timeline. One of these pieces of media typically includes opening the user's camera or microphone on their mobile device to apply augmented reality effects such as AR masks and the like.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A method for generating interactive media content on a portable electronic user device, the method including in one or more electronic processing devices:
   a) retrieving an Edit Decision List (EDL), the EDL providing an event driven timeline for the interactive media content including:
      i) one or more segments of pre-existing media content to be used in the generation of the interactive media content;
      ii) timestamps for when the one or more segments of pre-existing media content are to be introduced into the timeline and their associated duration;
      iii) one or more user interactions to be used in the generation of the interactive media content; and,
      iv) timestamps for when the one or more user interactions are to be introduced into the timeline and their associated duration; and,
   b) processing the EDL to generate the interactive media content in real time by:
      i) retrieving the one or more segments of pre-existing media content in accordance with associated events in the timeline of the EDL and causing playback to commence on a display of the user device;
      ii) automatically causing a sensing device of the user device to open and capture the one or more user interactions in accordance with instructions provided by associated events in the timeline of the EDL, wherein at least some of the user interactions are captured due to an event in the EDL that triggers a camera of the user device to perform face tracking, and wherein augmented reality (AR) effects are rendered onto the user's face in accordance with results of the face tracking; and
      iii) combining the one or more captured user interactions with the one or more segments of pre-existing media content in accordance with the event driven timeline of the EDL,
   wherein, each media component is processed on the user device and synchronised within 40 milliseconds per frame, at a rate of 25 frames per second, and
   wherein the EDL processing further includes:
      a) determining events in the EDL timeline that require buffering;
      b) deconstructing each event into required work units and initialising them;
      c) placing initialised work units into a pending queue for playback, playback commencing once a signal is received that there are sufficient work units produced or buffered into the pending queue;
      d) transferring work units from the pending queue into an active queue at a specified time;
      e) evaluating active work units for each frame; and,
      f) rendering and compositing the results of work units and presenting them to a display of the user device.

2. The method according to claim 1, wherein the method further includes receiving a user input via the user device indicative of a user selection of a type of interactive media content to be generated and whereby the EDL is retrieved at least in part based on the user selection.

3. The method according to claim 2, wherein the types of interactive media content to be generated include one or more of:
   a) stories;
   b) movies;
   c) songs; and,
   d) games.

4. The method according to claim 3, wherein a plurality of instances of one or more types of interactive media content are available for user selection.

5. The method according to claim 4, wherein each instance has an associated EDL defining how the interactive media content is to be generated.

6. The method according to claim 5, wherein each EDL is stored locally on the user device.

7. The method according to claim 6, wherein each instance is associated with one or more segments of pre-existing media content that are stored locally on the user device.

8. The method according to claim 7, wherein the one or more segments of pre-existing media content include one or more of:
   a) video;
   b) audio;
   c) images; and,
   d) overlays and effects.

9. The method according to claim 1, wherein the one or more user interactions include at least one of:
   a) a video recording of the user; and,
   b) an audio recording of the user recorded by a microphone of the user device.

10. The method according to claim 9, wherein the method includes in the one or more electronic processing devices:
    a) causing a camera of the user device to open;
    b) performing face tracking on the user's face via the camera; and,
    c) applying an augmented reality (AR) mask to the user's face using results of the face tracking.

11. The method according to claim 10, wherein the AR mask is applied to the user's face in the video recording.

12. The method according to claim 10, wherein the face tracking is used to overlay the AR mask onto a segment of pre-existing media content and wherein the AR mask moves in response to movement of the user's face.

13. The method according to claim 12, wherein the user can perform interactions via facial movements and gestures and wherein the method further includes in the one or more electronic processing devices:
    a) determining that a facial movement or gesture has been performed using the results of the face tracking; and,
    b) in response to determining that the facial movement or gesture has been performed, applying an effect to a current scene being generated.

14. The method according to claim 1, wherein the EDL defines at least one interaction cue at a pre-defined timestamp that prompts the user to perform an interaction via the user device and wherein the interaction cue is one or more of:
    a) an on-screen button which is displayed to the user on the user device;
    b) an audio cue provided in a segment of pre-existing media content; and,
    c) a visual cue provided in a segment of pre-existing media content.

15. The method according to claim 1, wherein combining the one or more recorded user interactions with the one or more segments of pre-existing media content includes one or more of:
    a) splicing the one or more user interactions between segments of pre-existing media content in accordance with the event driven timeline of the EDL; and,
    b) overlaying the one or more user interactions over one or more segments of pre-existing media content in accordance with the event driven timeline of the EDL.

16. The method according to claim 15, wherein overlaying the one or more user interactions over the one or more segments of pre-existing media content includes applying an audio or visual effect in sync with the time that the user performs the interaction.

17. The method according to claim 1, wherein the EDL includes a single pre-existing audio track that plays for the duration of the generated interactive media content.

18. The method according to claim 1, wherein the processing to generate the interactive media content is performed locally on the user device.

19. The method according to claim 1, wherein the method includes in the one or more electronic processing devices, simultaneously:
    a) decoding one or more segments of pre-existing video content;
    b) reading data from a camera stream;
    c) encoding the data read from the camera stream to form a video clip for replay; and,
    d) performing face tracking on the user's face in the camera stream.

20. The method according to claim 1, wherein an offset is added to the EDL to account for user reaction time when performing an interaction to ensure that a user video recording is in sync with one or more segments of pre-existing media content.

21. The method according to claim 20, wherein the offset is indicative of a delay between when the user video recording is initiated and when the video recording is spliced into the interactive media content being generated.

22. The method according to claim 1, wherein the method includes displaying a representation of the interactive media content to the user on the user device as the content is being generated in real time.

23. The method according to claim 1, wherein video and audio are synchronised from a single source of media in under 10 milliseconds.

24. The method according to claim 1, wherein transition from one media source to another occurs in under 1 millisecond.

25. The method according to claim 1, wherein rendering augmented reality effects onto the user's face in accordance with results of the face tracking includes:
    a) performing facial analysis in under 15 milliseconds;
    b) processing an output of the facial analysis into a 3D affine transformation in under 1 millisecond; and,
    c) compositing and rendering video with 3D meshes in under 10 milliseconds.

26. The method according to claim 1, wherein a multi-threaded asset loading system is used to asynchronously process the EDL.

27. The method of claim 1, wherein the work units are directed acyclic graphs (DAGs).

28. A system for generating interactive media content on a portable electronic user device, the system including one or more electronic processing devices configured to:
    a) receive a user input via the user device indicative of a user selection of a type of interactive media content to be generated;
    b) retrieve an Edit Decision List (EDL) based at least in part on the user selection, the EDL providing an event driven timeline for the interactive media content including:
       i) one or more segments of pre-existing media content to be used in the generation of the interactive media content;
       ii) timestamps for when the one or more segments of pre-existing media content are to be introduced into the timeline and their associated duration;
       iii) one or more user interactions to be used in the generation of the interactive media content; and,
       iv) timestamps for when one or more user interactions are to be introduced into the timeline and their associated duration; and,
    c) process the EDL to generate the interactive media content in real time by:
       i) retrieving the one or more segments of pre-existing media content in accordance with associated events in the timeline of the EDL and causing playback to commence on a display of the user device;
       ii) automatically causing a sensing device of the user device to open and capture the one or more user interactions in accordance with instructions provided by associated events in the timeline of the EDL, wherein at least some of the user interactions are captured due to an event in the EDL that triggers a camera of the user device to perform face tracking, and wherein augmented reality (AR) effects are rendered onto the user's face in accordance with results of the face tracking; and, iii) combining the one or more captured user interactions with the one or more segments of pre-existing media content in accordance with the event driven timeline of the EDL, wherein, each media component is processed on the user device and synchronised within 40 milliseconds per frame, at a rate of 25 frames per second, and wherein the EDL processing further includes:
a) determining events in the EDL timeline that require buffering;
b) deconstructing each even into required work units and initialising them;
c) placing initialised work units into a pending queue for playback, playback commencing once a signal is received that there are sufficient work units produced or buffered into the pending queue;
d) transferring work units from the pending queue into an active queue at a specified time;
e) evaluating active work units for each frame; and,
f) rendering and compositing the results of work units and presenting them to a display of the user device.

29. The system according to claim 28, wherein the interactive media content is generated by application software executing on the user device.

30. The system according to claim 29, wherein the application software includes a mobile video engine for use in generating the interactive media content.

31. The system according to claim 30, wherein the user device includes a data store for storing at least:
a) the EDL;
b) the one or more segments of pre-existing media content; and,
c) the generated interactive media content.

32. The system according to claim 28, wherein the one or more electronic processing devices form part of the user device.

33. A mobile video engine for use in generating interactive media content on a portable electronic user device, the mobile video engine including computer executable code, which when executed by at least one suitably programmed electronic processing device causes the at least one processing device to:
a) retrieve an Edit Decision List (EDL), the EDL providing an event driven timeline for the interactive media content including:
i) one or more segments of pre-existing media content to be used in the generation of the interactive media content;
ii) timestamps for when the one or more segments of pre-existing media are to be introduced into the timeline and their associated duration;
iii) one or more user interactions to be used in the generation of the interactive media content; and,
iv) timestamps for when the one or more user interactions are to be introduced into the timeline and their associated duration; and,
b) process the EDL to generate the interactive media content in real time by:
i) retrieving the one or more segments of pre-existing media content in accordance with associated events in the timeline of the EDL and causing playback to commence on a display of the user device;
ii) automatically causing a sensing device of the user device to open and capture the one or more user interactions in accordance with instructions provided by associated events in the timeline of the EDL, wherein at least some of the user interactions are captured due to an event in the EDL that triggers a camera of the user device to perform face tracking, and wherein augmented reality (AR) effects are rendered onto the user's face in accordance with results of the face tracking; and,
iii) combining the one or more captured user interactions with the one or more segments of pre-existing media content in accordance with the event driven timeline of the EDL, wherein, each media component is processed on the user device and synchronised within 40 milliseconds per frame, at a rate of 25 frames per second, and wherein the EDL processing further includes:
a) determining events in the EDL timeline that require buffering;
b) deconstructing each event into required work units and initialising them;
c) placing initialised work units into a pending queue for playback, playback commencing once a signal is received that there are sufficient work units produced or buffered in the pending queue;
d) transferring work units from the pending queue into an active queue at a specified time;
e) evaluating active work units for each frame; and,
f) rendering and compositing the results of work units and presenting them to a display of the user device.

34. The mobile video engine according to claim 33, wherein the mobile video engine causes a representation of the generated interactive media content to be displayed on a display of the user device.

35. The mobile video engine according to claim 33, wherein the mobile video engine processing is performed locally on the user device.

* * * * *